(12) United States Patent
Samanta et al.

(10) Patent No.: US 10,943,119 B2
(45) Date of Patent: Mar. 9, 2021

(54) APPARATUS AND METHOD FOR PERFORMING VIEWER GAZE ANALYSIS

(71) Applicant: SAMSUNG ELECTRONICS CO., LTD., Suwon-si (KR)

(72) Inventors: Pranay Kumar Samanta, Noida (IN); Pradeep Kumar Botu, Noida (IN); Pratibha Raj Patel, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 62 days.

(21) Appl. No.: 16/163,777

(22) Filed: Oct. 18, 2018

(65) Prior Publication Data
US 2019/0130184 A1     May 2, 2019

(30) Foreign Application Priority Data
Oct. 31, 2017    (IN) .......................... 2017 1 1038739

(51) Int. Cl.
*G06T 1/00*      (2006.01)
*G06K 9/00*      (2006.01)
(Continued)

(52) U.S. Cl.
CPC ......... *G06K 9/00671* (2013.01); *G06F 1/163* (2013.01); *G06F 3/013* (2013.01); *G06K 9/00369* (2013.01); *G06Q 30/0631* (2013.01); *G06T 7/60* (2013.01); *G06T 7/70* (2017.01); *G06K 9/00255* (2013.01); *G06K 9/00302* (2013.01); *G06T 7/50* (2017.01); *G06T 2207/30196* (2013.01); *G06T 2207/30244* (2013.01); *H04N 5/2253* (2013.01)

(58) Field of Classification Search
CPC ...... G06F 1/3231; G06F 3/013; G06F 1/3265; G06F 1/163; G06F 17/18; G06F 3/017; G06K 9/00221; G06K 9/00369; G06K 9/00671; G06T 7/50; G06T 7/60; G06T 7/70; G06T 13/40; G06T 19/006; G06Q 30/0631
USPC ..................... 345/633; 348/54, 468; 382/103
See application file for complete search history.

(56) References Cited

U.S. PATENT DOCUMENTS 7,682,026 B2    3/2010    Huffman et al.
7,742,623 B1    6/2010    Moon et al.
(Continued)

FOREIGN PATENT DOCUMENTS

KR    10-2015-0003591 A    1/2015
KR    10-2016-0067373 A    6/2016
(Continued)

OTHER PUBLICATIONS

International Search Report (PCT/ISA/210) dated Jan. 18, 2019 issued by the International Searching Authority in International Application No. PCT/KR2018/011840.
(Continued)

*Primary Examiner* — Phuoc H Doan
(74) *Attorney, Agent, or Firm* — Sughrue Mion, PLLC

(57) ABSTRACT

A system and a method for performing viewer gaze analysis are provided. The method includes detecting at least one item worn by a user of a wearable computing device, detecting at least one gaze of a viewer towards the at least one item worn by the user, and providing at least one recommendation for the user based on the at least one gaze.

34 Claims, 34 Drawing Sheets

(51) Int. Cl.
  *G06F 3/01* (2006.01)
  *G06T 7/60* (2017.01)
  *G06T 7/70* (2017.01)
  *G06Q 30/06* (2012.01)
  *G06F 1/16* (2006.01)
  *G06T 7/50* (2017.01)
  *H04N 5/225* (2006.01)

(56) References Cited

U.S. PATENT DOCUMENTS

| | | |
|---|---|---|
| 2010/0080418 A1 | 4/2010 | Ito |
| 2012/0314045 A1 | 12/2012 | Billard et al. |
| 2014/0313129 A1* | 10/2014 | Elvesjo ............ G06F 1/3287 345/156 |
| 2015/0002676 A1 | 1/2015 | Yoo |
| 2015/0358594 A1 | 12/2015 | Marshall et al. |
| 2016/0086023 A1 | 3/2016 | Anabuki et al. |
| 2017/0053448 A1 | 2/2017 | Kim |
| 2017/0308919 A1 | 10/2017 | Karuvath et al. |

FOREIGN PATENT DOCUMENTS

| | | |
|---|---|---|
| KR | 10-2017-0022078 A | 3/2017 |
| KR | 10-2017-0090585 A | 8/2017 |

OTHER PUBLICATIONS

Written Opinion (PCT/ISA/237) dated Jan. 18, 2019 issued by the International Searching Authority in International Application No. PCT/KR2018/011840.

Communication dated Jun. 17, 2020 issued by the European Intellectual Property Office in counterpart European Application No. 18872014.8.

* cited by examiner

APPARATUS AND METHOD FOR PERFORMING VIEWER GAZE ANALYSIS

CROSS REFERENCE TO RELATED APPLICATION

This application is based on and claims priority under 35 U.S.C. § 119 to Indian Complete Patent Application No. 201711038739, filed on Oct. 31, 2017, in the Indian Patent Office, the disclosures of which are incorporated by reference herein in their entirety.

BACKGROUND

1. Field

Apparatuses and methods consistent with example embodiments relate to analysing viewer gaze towards a user and, in particular, relate to providing recommendations to a user based on viewer gaze analysis.

2. Description of Related Art

Individuals are often bewildered in selecting wardrobe items such as apparels, footwear, accessories, and the like for every day wearing. For instance, when dressing up for work, an individual is often puzzled about what to wear or what combination of clothes would suit him best. Similarly, when selecting an outfit for an event, e.g., an ethnic event, the individual may get confused as to which of his different ethnic outfits would suit him best. When faced with such uncertainty about dressing up, individuals often rely on others' opinion. For example, the individual may seek an opinion from family members or friends. However, such opinions formed based on a limited set of people may not reflect a true measure of the individual's appearance in specific attire. Thus, the individual may not get correct guidance about dressing up.

A similar situation arises when the individual is shopping for such wardrobe items. For example, consider a case when the individual is physically shopping for such items, for example, by visiting clothing stores and shopping malls. In such a case, if not accompanied by other individual(s), the individual has to rely on self-judgement or on clothing store assistant's opinion as to how a particular item is suiting him. Even if accompanied by other individual(s), opinion about how a particular item is suiting him may not reflect a true measure, as mentioned above. In another case, when the individual is doing online shopping for items, suggestions and recommendations related to items are often based on factors such as previously purchased items, latest fashion trends, items purchased by other individuals of similar age group, and the like. However, none of the suggestions or recommendations reflects how well the item would suit the individual.

U.S. Pat. No. 7,742,623 B1 describes method and system to estimate a visual target that people are looking based on automatic image measurements. The eye gaze is estimated based on either the positions of localized eyes and irises or on the eye image itself, depending on the quality of the image. The gaze direction is estimated from the eye gaze measurement in the context of the three-dimensional facial pose. The gaze target is determined based on the estimated gaze direction, estimated head pose, and the camera calibration. The gaze target estimation can provide a gaze trajectory of the person or a collective gaze map from many instances of gaze. The patent discloses methods and systems for gaze detection. However, the patent does not describe providing recommendations to users.

U.S. Pat. No. 7,682,026 B2 describes system and method for gaze detection of an animate subject, typically a human. The subject's pupils are located in three dimensional space, using red-eye detection techniques and triangulation. Then, the gaze direction is determined based on the shape of the subject's irises. However, the patent does not describe the utilization of the gaze data collected and providing recommendations to users.

US 2012/0314045 A1 describes a non-obtrusive portable device, wearable from infancy through adulthood, mounted with i) a set of two or more optical device(s) providing visual and audio information as perceived by the user; ii) an actuated mirror or optical device returning visual information on part of the face of the user. The audio-visual signals may be processed on-board or off board via either hardwired or wireless transmission. Analysis of audio visual signal permit among other things tracking of the user's gaze or facial features and of visual and auditory attention to external stimuli. The wearable device focuses on the user's gaze and audio signals records the perception and view of the user. However, the patent publication does not disclose providing recommendations to users.

Thus, in light of the above, there exists a need for a solution to overcome at least one of the aforementioned deficiencies.

SUMMARY

This summary is provided to introduce a selection of concepts in a simplified format that are further described in the detailed description. This summary is neither intended to identify key or essential inventive concepts of the application, nor is it intended for determining the scope of the inventive concept.

According to an embodiment, a method comprises detecting at least one item worn by a user of a wearable camera device, detecting at least one gaze of a viewer towards the at least one item worn by the user, and providing at least one recommendation for the user based on the at least one gaze.

In another embodiment, a system comprises a processor and a memory storing instructions executable by the processor where the processor is configured to detect at least one item worn by a user of a wearable computing device, detect at least one gaze of a viewer towards the at least one item worn by the user, and provide at least one recommendation for the user based on the at least one gaze.

In another embodiment, a method comprises detecting at least one item worn by a user of a wearable camera device, detecting at least one gaze of a viewer towards the at least one item worn by the user, generating a gaze pattern for the at least one item worn by the user based on the at least one gaze, and providing the gaze pattern to the user.

In another embodiment, a system comprises a processor and a memory storing instructions executable by the processor where the processor is configured to detect at least one item worn by a user of a wearable computing device, detect at least one gaze of a viewer towards the at least one item worn by the user, and provide at least one recommendation for the user based on the at least one gaze.

In another example, a computer program product includes a non-transitory computer recording medium for storing a computer program that is capable of being executed by an electronic device where the computer program comprises an operation of detecting at least one item worn by a user of a wearable computing device, an operation of detecting at least one gaze of a viewer towards the at least one item worn by the user, and an operation of providing at least one recommendation for the user based on the at least one gaze.

In another example, a computer program product includes a non-transitory computer recording medium for storing a computer program that is capable of being executed by an electronic device where the computer program comprises an operation of detecting at least one item worn by a user of a wearable computing device, an operation of detecting at least one gaze of a viewer towards the at least one item worn by the user, an operation of generating a gaze pattern for the at least one item worn by the user based on the at least one gaze, and an operation of providing the gaze pattern to the user.

To further clarify advantages and features of the present invention, a more particular description of the inventive concept will be rendered by reference to specific embodiments thereof, which is illustrated in the appended drawings. It is appreciated that these drawings depict only typical embodiments of the inventive concept and are therefore not to be considered limiting of its scope. The inventive concept will be described and explained with additional specificity and detail with the accompanying drawings.

BRIEF DESCRIPTION OF THE DRAWINGS

These and other features, aspects, and advantages of certain embodiments of the present disclosure will become better understood when the following detailed description is read with reference to the accompanying drawings in which like characters represent like parts throughout the drawings, wherein.

Figure 1:
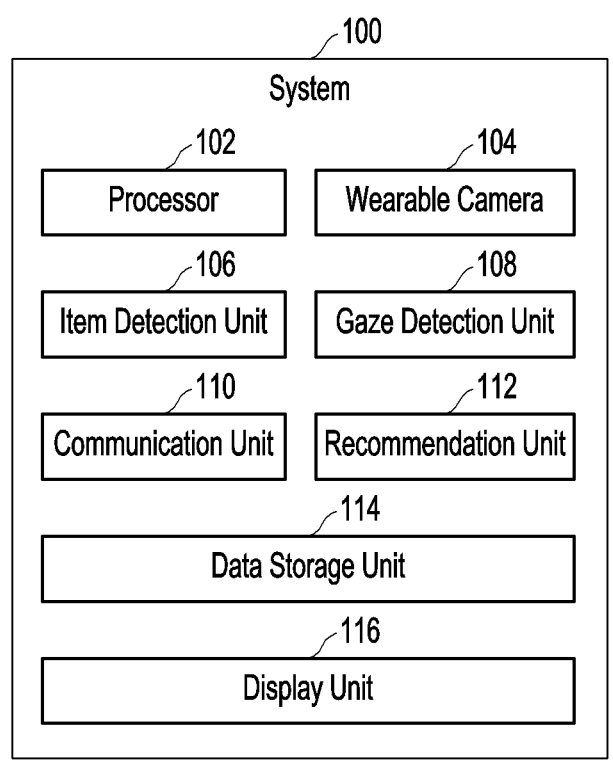
FIG. 1 illustrates a system in accordance with an embodiment.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the inventive concept is thereby intended, such alterations and further modifications in the illustrated system, and such further applications of the principles of the disclosure as illustrated therein being contemplated as would normally occur to one skilled in the art to which the inventive concept relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying drawings.

FIG. 1 illustrates a system 100 according to an embodiment of the present disclosure. In an example, the system 100 may be implemented for capturing gaze events, i.e., gazes of viewers towards items worn by a user of a wearable camera device. Based on the captured gazes, viewer gaze analysis may be performed and accordingly, the user may be provided with recommendations for wearing items.

In an example, the system 100 includes a processor 102, a wearable camera 104, an item detection unit 106, a gaze detection unit 108, a communication unit 110, a recommendation unit 112, a data storage unit 114, and a display unit 116. The item detection unit 106, the gaze detection unit 108, and the recommendation unit 112 may be implemented as signal processor(s), state machine(s), logic circuitries, and/or any other device or component that manipulate signals based on operational instructions. Further, the item detection unit 106, the gaze detection unit 108, and the recommendation unit 112 can be implemented in hardware, instructions executed by a processing unit, or by a combination thereof. The processing unit may comprise a computer, a processor such as the processor 102, a state machine, a logic array or any other suitable devices capable of processing instructions. The processing unit may be a general-purpose processor which executes instructions that cause the general-purpose processor to perform required tasks, or, the processing unit may be dedicated to perform the required functions. In another example, the item detection unit 106, the gaze detection unit 108, and the recommendation unit 112 may be machine-readable instructions (software) which, when executed by a processor/processing unit, perform any of the described functionalities. The data storage unit 114 may be a repository/storage medium/data store for storing data processed, received, and generated by one or more of the item detection unit 106, the gaze detection unit 108, and the recommendation unit 112.

As mentioned above, the system 100 may be implemented for viewer gaze analysis. In an example, the system 100 is configured prior to being implemented for viewer gaze analysis. Configuration of the system 100 includes constructing a gaze plane, determining user dimensions such as height and width, and determining a position of a wearable computing device on the user's body. The gaze plane may be understood as a plurality of grids corresponding to a physical structure of the user. As an initial step towards configuring the system 100, an image of the user is captured or received. For example, in a case where the system 100 is being implemented in a wearable computing device, the user may stand in front of a mirror and the image of the user may be captured using the wearable camera 104. In another example, the user may capture the image using a camera of a computing device of the user. Subsequently, the user may transmit the image to the system 100. In this example, the communication unit 110 receives the image of the user. In either of the aforementioned examples, while capturing the image of the user, a distance of the user from the mirror is recorded using a proximity sensor (not shown in FIG. 1) of the system 100. In the example where the image is captured using the computing device, the distance is transmitted along with the image to the system 100. The image of the user and the distance from the mirror are stored as image data in the data storage unit 114.

Once the image data is recorded, the configuration of the system 100 may be performed either automatically or, semi-automatically using user inputs. In an example where the configuration of the system 100 is performed automatically, the item detection unit 106 obtains the image from the data storage unit 114 and generates the gaze plane based on the image. For generating the gaze plane, the item detection unit 106 divides the image into a plurality of rectangular grids and subsequently implements a pattern recognition algorithm to identify and mark grids corresponding to the user's body. That is, grids falling on the user's body are identified and marked, e.g., using a first tag. The grids falling on the user's body may be referred to as virtual body zones. The first tag may be understood as an indicator or an identifier denoting that the tagged grid is to be considered for viewer gaze analysis. Other grids, not falling on the user's body are discarded and/or marked using a second tag. The second tag may be understood as an indicator or an identifier depicting that the tagged grid is not to be considered for viewer gaze analysis. The gaze plane is stored in the data storage unit 114.

Subsequent to the generation of the gaze plane, the item detection unit 106 determines the user dimensions such as height and width of the user based on the image data. For determining the user's dimensions, the item detection unit 106 determines a height of the user in the image. Based on the height of the user in the image and the distance between the user and the mirror, the item detection unit 106 determines the user's dimensions. In an example, the user's dimensions are stored as user data in the data storage unit 114.

Once the user's dimensions are determined, the item detection unit 106 determines the position of the wearable computing device on the user's body. In an example, the item detection unit 106 determines the position of the wearable computing device on the user's body based on the user data and a heart sensor. In this example, the item detection unit 106 may determine a position of the heart based on the user data. Once the position of the heart is determined, the item detection unit 106 determines the distance of the wearable computing device from the heart using the heart sensor. Thus, the position of the wearable computing device is determined. In another example, the item detection unit 106 may implement a pattern recognition technique on the image for identifying the position of the wearable computing device on the user's body.

Thus, the system 100 is configured automatically in a manner as described above.

As mentioned above, the system 100 may also be configured semi-automatically based on user inputs. In this case, the gaze plane may be constructed based on the user inputs. For instance, once the item detection unit 106 divides the image of the user into the plurality of rectangular girds, the plurality of grids may be displayed to the user on the computing device. Subsequently, the user may provide a user input to select one or more grids that are of interest to the user. For instance, the user may only be interested in having the viewer gaze analysis for specific clothing items such as shirt and trouser. In such a case, the user selects grids corresponding to body regions corresponding to shirt and trouser. The grids selected by the user are subsequently stored as gaze plane in the data storage unit 114.

In another example, the user's dimensions may be determined based on a user input received from the user. For instance, during configuration of the system 100, an application interface for providing user's dimensions as input values may be displayed to the user through the computing device. Thereafter, the user may provide user input specifying one or more user dimensions such as height and width.

In another example, the position of the wearable computing device may be determined based on a user input. For instance, a sketch of the user body may be displayed to the user using the computing device. Subsequently, the user may select the position of the wearable computing device on the sketch. In another example, the user may provide a distance of the wearable computing device from top and centre of the body as user input. Accordingly, the item detection unit 106 determines the position of the wearable computing device on the user's body.

Thus, the system 100 is configured semi-automatically in a manner as described above.

Further, as a part of configuration of the system 100, the item detection unit 106 processes the image using an image recognition technique to detect a plurality of items worn by the user. During processing, one or more image layers from the image are detected and subsequently, items in each of the one or more image layers are detected. In addition to detecting the items, one or more attributes associated with the items may also be identified. As an example, in the image of the user, the item detection unit 106 may detect items, such as wristwatch, cap, earrings, eyewear, shoes, belt, and the like. In addition, the item detection unit 106 may identify attributes, for example, colour, associated with the respective items.

After the detection of the plurality of items, in an example, the item detection unit 106 may generate a list of the plurality of items. The communication unit 110 transmits the list to the computing device where the list is displayed to the user. In response to the displaying, the user may select at least one item from the list for which the viewer gaze analysis is to be performed. In an example, the user may select all the items in the list. The user selection is then transmitted to the system 100. Thus, at least one item worn by the user for which the viewer gaze analysis is to be performed is detected by the item detection unit 106. Further, in an example, the item detection unit 106 may map the detected at least one item onto at least one virtual body zone from the plurality of virtual body zones. For instance, the item detection unit 106 may detect a wristwatch of the user and may map the wristwatch to a virtual body zone corresponding to a wrist of the user.

As mentioned above, the items being currently worn by the user are detected by the system 100. In an implementation, the system 100 may create a repository of items for the user. In this implementation, besides adding the currently worn items to the repository, the system 100 may prompt the user to add other items of the user to the repository. In response to the prompt, the user may add the other items to the repository. For instance, the user may capture images of the other items using the wearable camera 104. Based on the captured images, the system 100 may update the repository of items. The repository of the user may be stored in the user data. In an example, the repository may be used by the system 100 in future for identifying items worn by the user.

Additionally, in an implementation, the system 100 may receive a user input related to items of the user. The user input may include, for instance, the in order to create a repository of items, besides the currently worn items, After configuration of the system 100, the system 100 may be implemented for viewer gaze analysis. Following description provides details related to the viewer gaze analysis.

In operation, the gaze detection unit 108 detects at least one gaze of a viewer towards the at least one item worn by the user. The detection of the at least one gaze, in an example, may be based on at least one hardware specification, for example, a processing power or a camera specification, of the system 100. For detecting the at least one gaze, the gaze detection unit 108 may implement gaze detection and tracking techniques. In an example, the gaze detection unit 108 may implement a gaze detection technique based on active Infrared (IR) illumination that uses special bright pupil effect. In this technique, a dark pupil image and a bright pupil image of a viewer are obtained by illuminating the eyes of the viewer using one or more IR LEDs that are located off and on the optical axis respectively. The IR LEDs used herein operate at a power of 32 mW in a wavelength band 40 nm at a nominal bandwidth of 888 nm, in an example. Based on a difference of these two images, the pupil of the viewer is detected. Thereafter, an optical band pass filter having a wavelength pass band of 10 nm wide is used. The filter increases the signal to noise ratio by a significant factor. The IR LEDs used herein operate alternately to provide even and odd fields of an interlaced image. Further, two interlaced input images are de-interlaced via a video decoding, producing even and odd field images. For even field image, the inner rings of IR LEDs are on and outer ring of IR LEDs are off and vice versa for odd field image. In an example, the odd field image is subtracted from the even field image to eliminate the background and external light illumination. Subsequently, a threshold factor is used to improve the difference image. Upon aforementioned processing, the result image contains pupil blobs and other noise blobs. In an example, a connected component analysis is then implemented to identify each binary blob to identify blobs containing the pupil. Typically, pupil blobs are in elliptical shape and an ellipse filtering method may be implemented by the gaze detection unit 108 to identify the elliptical pupil blobs. For further identification of pupils, the gaze detection unit 108 implements support vector technique, in an example. In this example, two class pattern recognition with predictive learning from examples may be implemented together. For subsequent images, the gaze detection unit 108 may use mean shift method for eye tracking or pupil tracking. In addition, after locating the eye in a previous frame, probable positions of eye in the current frame may be predicted by the gaze detection unit 108 using the Kalman filter. Thus, as explained, the gaze detection unit 108 detects the at least one gaze of the viewer.

Subsequent to the detection of the at least one gaze, the gaze detection unit 108 determines a look-at position of the gaze. In other words, the gaze detection unit 108 determines which item(s) of the user the viewer is looking at. In an example, the gaze detection unit 108 determines the look-at position based on a relative position between the glint and the pupil and one or more other parameters. A glint is a small bright spot near the pupil image, resulting from light reflection from the surface of the cornea. Typically, the glint can be detected easily from the dark image since both glint and pupil appear equally in the dark image as compared to the bright pupil image where they overlap. On the other hand, in the dark image, the glint is much brighter than the rest of the eye image. The one or more other parameters include:

a) a ratio based on the angle of face with respect to the gaze plane;
b) In-plane angle to account face rotation around the camera optical axis; and
c) In-plane head translation of the viewer.

In an example, in addition to the one or more parameters, the gaze detection unit 108 may determine the look-at position based on one of a distance of the viewer from the user and a viewing angle of the viewer. For instance, in a case where the distance is equal to or greater than a threshold distance, the viewing angle of the viewer may increase and the determination of the look-at position may not be accurate. In such a case, the gaze may be discarded. In another case where the distance is less than the threshold distance and the viewing angle may be determined with accuracy, the gaze detection unit 108 may retain the gaze for further processing.

As explained above, the gaze detection unit 108 determines the look-at position of the viewer. Subsequent to the determination of the look-at position, the gaze detection unit 108 may map the gaze onto the at least one item based on at least one of an area of the corresponding virtual body zone and a threshold time-period. For instance, the gaze detection unit 108 may determine whether the look-at position is falling on the at least one item or not. If the look-at position is falling onto the at least one item, the gaze detection unit 108 maps the gaze onto a virtual body zone corresponding to the item. If the gaze is not falling on the at least one item, the gaze detection unit 108 may discard the gaze. In another example, the gaze detection unit 108 may map the gaze based on the threshold time-period. For instance, the gaze detection unit 108 may identify whether a gaze duration of the gaze is equal to or greater than the threshold time-period or not. In a case where the gaze duration is less than the threshold time-period, the gaze detection unit 108 may discard the gaze. In another case where the gaze duration is equal to or greater than the threshold time-period, the gaze detection unit 108 may map the gaze onto the virtual body zone corresponding to the at least one item. Thus, as explained, the gaze detection unit 108 detects the at least one gaze in respect of the at least one item. Additionally, in an example, the gaze detection unit 108 may update a gaze hit counter associated with the at least one item based on the at least one gaze. For instance, the user may wear a cap and may traverse a market area. In such a case, for each gaze on the cap, the gaze detection unit 108 may update the gaze hit counter of the at least one item.

Upon mapping the detected gaze onto the at least one item, the gaze detection unit 108 may record at least one gaze parameter associated with the gaze. In an example, the at least one gaze parameter may be one of:
 a) the gaze duration of the at least one gaze;
 b) a location of where the at least one gaze is detected;
 c) a face shot of the viewer;
 d) a body shot of the viewer;
 e) a time associated with the at least one gaze;
 f) a facial expression of the viewer associated with the at least one gaze;
 g) an audio of the viewer associated with the at least one gaze;
 h) an identity of the viewer;
 i) a gender of the viewer; and
 j) a gaze identity of the at least one gaze.

As an example, consider a case where the user is shopping in a shopping mall and is wearing a wearable computing device, for example, a clip camera, implementing the system 100. The clip camera in this case may detect the viewers' gazes towards the items worn by the user. Along with each of the gaze, the clip camera may record a gaze duration of the gaze. Further, the clip camera may also record a location of the shopping mall. Further, in an example, the clip camera may record either a face shot or a body shot of the viewer. In another example, the clip camera may record a time associated with the gaze. Further, the clip camera may record a facial expression associated with the gaze. For instance, the viewer's facial expression may represent a liking of an item, e.g., a wristwatch, of the user. In another example where the viewer may have uttered a sound, for example, "nice watch", the sound may be recorded by the clip camera. In a further example, the clip camera may record an identity of the user. For instance, in a case where the user meets a friend in the shopping mall, the clip camera records the friend's gaze towards the items worn by the user and may associate the gazes with an identity, for example, a name, of the friend. Further, in an example, the clip camera may record a gender of the viewer. Additionally, the clip camera may record a gaze identity of each of the gazes.

In an example, the captured gaze and associated gaze parameters may be stored in the data storage unit 114 as gaze data. An example database comprising the gaze data is illustrated below.

Example Gaze Data

| Gaze ID | Person ID | Gaze plane grid index | Device Location | Gaze map/ user body | Gender | Start Time | End Time | GPS Location |
|---|---|---|---|---|---|---|---|---|
| Gid1 | PID1 | Z44, Z45, Z46, Z54, Z55 | Z10 | Z8 | Male | 2017/02/15 09:10:33 | 2017/02/15 09:10:35 | 28.5677015, 77.320135 |
| Gid2 | PID1 | Z10, Z11, Z21, Z22, Z31 | Z10 | Z2 | Male | 2017/02/15 09:10:36 | 2017/02/15 09:10:38 | 28.5677015, 77.320135 |
| Gid3 | PID3 | Z44, Z45, Z46, Z54, Z55 | Z8 | Z8 | Female | 2017/02/17 10:05:35 | 2017/02/17 10:05:38 | 28.5387968, 77.340028 (Office) |

The example gaze data illustrated above includes three viewer gaze entries having gaze identities (IDs), Gid1, Gid2, and Gid3, respectively. In an example, with each of the Gid1, Gid2, and Gid3, at least one gaze parameter may be recorded. For instance, as shown above, along with Gid1, a person identity (ID) PID1 associated with the viewer is also recorded. Further, a gaze plane grid index is also recorded. The gaze plane grid index includes virtual body zones Z44, Z45, Z46, Z54, and Z55. The gaze data further includes a GPS location of the user when the gaze is recorded. In an example, the GPS location of the user may be recorded using a GPS sensor provided in either of the wearable computing device or the computing device of the user. Further, a virtual body zone Z10 corresponding to the position of the wearable computing device is also recorded. As mentioned above, the position of the wearable computing device is recorded during the configuration of the system 100. Further, a virtual body zone "Z8" at which the look at position of the viewer gaze falls is also recorded. Further, as shown above, a gender "Male" is also recorded. The gaze data further includes a start time and an end time of the corresponding to the Gid1. As shown, similar entries for Gid 2, and Gid3 are also recorded.

In an example, the gaze detection unit 108 may generate a gaze pattern for the at least one item based on the at least one gaze and the at least one gaze parameter. The gaze pattern corresponding to an item includes details related to all gazes received towards the item. For instance, the gaze pattern may include a number of gazes received in respect of the item. Further, for each of the gazes, the gaze pattern may include corresponding gaze parameters such as location, time, gender of the viewer, and the like. In an example, the gaze detection unit 108 may store the gaze pattern corresponding to the gaze in the gaze data. As may be understood, the gaze data may include previously generated gaze patterns. In an example, the gaze pattern may be provided to the user using the display unit 116. That is, the gaze pattern may be displayed to the user using the display unit 116.

In an implementation, the gaze detection unit 108 may detect the at least one gaze in respect of the at least one item based on a set of user-defined rules. In an example, the set of user-defined rules may be defined by the user during the configuration of the system 100. For instance, a list of options corresponding to the user defined rules may be presented to the user and, the user may select one or more rules which the user wants to implement. In an example, the set of user-defined rules may include:

a) the user being at a predetermined location;
b) the gaze being detected during a predefined time of the day;
c) the viewer being a predefined user;
d) the viewer being of a predefined gender;
e) the at least one item being a user selected item;
f) the gaze being of a predefined duration; and
g) a gaze frequency being greater than a predefined threshold frequency.

In an example, the set of user-defined rules may be applicable at any stage of the detection of the at least one gaze. For instance, prior to commencing the gaze detection, the gaze detection unit 108 may determine a location of the wearable camera 104 and may compare the determined location with the predetermined location. In a case where the location does not match the predetermined location, the gaze detection may not be performed. For instance, the user may seek to have the viewer gaze analysis be performed when the user is at the gym. In such a case, the gaze detection may only commence when the detected location is gym. In another example, the gaze may be recorded only if the at least one item is an item selected by the user. For instance, the user may be wearing accessories such as a cap, a wristwatch, a bandana, and a bracelet. In an example, the user may only wish to have viewer gaze analysis only for the cap. In such a case, if the gaze is falling upon any item other than the cap, the gaze may be discarded. As may be understood, the user may selectively implement the set of user-defined rules. That is, one or more of the user-defined rules may be applied by the user. In another example, the user may select to apply all or none of the set of user-defined rules. Based on the user selection of the set of user-defined rules, the gaze detection unit 108 may operate accordingly to detect the at least one gaze in respect of the at least one item.

The foregoing description describes capturing of the viewer's gazes and generating gaze data based on the captured gazes. In an example, the gaze data may be used for providing recommendations related to the items to the user. For instance, the user may seek recommendations while getting ready for work. In another example, the gaze data may be shared with enterprises such as garment/fashion enterprises or e-commerce enterprises. In this example, the garment/fashion enterprises or e-commerce enterprises may use the gaze data for target advertising. Thus, based on the gaze data associated with the user, meaningful recommendations in the form of advertisements may be provided to the user.

Following description describes details about providing recommendation to the user.

In an example, the recommendation unit 112 may provide at least one recommendation for the user based on the at least one gaze. For instance, the recommendation unit 112 may provide a recommendation to wear the at least one item based on the at least one gaze parameter. In this example, the recommendation unit 112 may analyse the gaze data based on the at least one parameter for providing the recommendation. For instance, the user may seek for a recommendation to wear items for a specific location, e.g., a mall. In such a case, the recommendation unit 112 may analyse the gaze data based on the specific location. That is, the recommendation unit 112 may identify one or more items from the plurality of items based on corresponding gaze hit counters. For example, an item 1 having a gaze hit counter of 250, an item 2 having a gaze hit counter of 220, and so on, may be identified. The identified one or more items are subsequently provided as recommendations to the user.

In another example, the recommendation unit 112 may detect an upcoming event. For example, the recommendation unit 112 may monitor calendar data stored in the data storage unit 114 and based on the calendar data, the recommendation unit 112 may detect the upcoming event. In an example, the recommendation unit 112 may also identify the at least one parameter associated with the upcoming event. For instance, in a case if the upcoming event is a conference at xyz location, the recommendation unit 112 may identify the xyz location parameter. In another example, in a case where the upcoming event is a lunch meeting with a friend, the recommendation unit 112 may identify, a location, a predetermined person, a predetermined gender, associated with the upcoming event. Based on the at least one parameter, the recommendation unit 112 may analyse the gaze data as explained above and may provide the at least one recommendation.

In yet another example, the recommendation unit 112 may provide a recommendation to purchase a further item. In this example, the recommendation unit 112 may identify an item of the user having highest gaze hits based on the gaze data. For example, a shirt of the user having highest haze hits may be identified. Based on the identified item, the recommendation unit 112 may provide recommendations to purchase similar items. In a further example, the recommendation unit 112 may provide a cumulative personality index associated with an item. In an example, the recommendations related to the items are provided to the user using the display unit 116.

The foregoing description describes examples where the viewer gaze analysis may be performed for providing recommendations to users.

In an example, the user may seek to view the gaze data. In this example, the user may access an application provided on the computing device. On accessing the application, the user may be provided with one or more options based on the at least one gaze parameter. For instance, the user may be provided with options to view items based on a location, a gender, predefined users, and the like. In another example, an option may include a list of items. In response to the display of the options, the user may select an option. For instance, the user may select the list of items and may subsequently select an item from the list. Based on the user selection, the gaze detection unit 108 may retrieve the gaze pattern corresponding to the selected item. Subsequently, the gaze detection unit 108 may cause display of the gaze pattern corresponding to the selected item through a display of the computing device.

The various components of the system 100 as defined above may form part of a single device, which may, for example, be in the form of a wearable computing device such as smartwatches, optical head mounted devices, clip cameras, and the like.

Alternatively, various components of the system as defined above may form part of two or more devices. In other words, the system 100 may be implemented in a distributed manner using one or more of the wearable computing devices and the computing devices.

By way of example, at least one of the processor 102, the wearable camera 104, the item detection unit 106, the gaze detection unit 108, the communication unit 110, the recommendation unit 112, the data storage unit 114, and the display unit 116 may form part of a first device. While a remaining of the processor 102, the wearable camera 104, the item detection unit 106, the gaze detection unit 108, the communication unit 110, the recommendation unit 112, the data storage unit 114, and the display unit 116 may form part of at least one further device.

By way of another example, at least two of the processor 102, the wearable camera 104, the item detection unit 106, the gaze detection unit 108, the communication unit 110, the recommendation unit 112, the data storage unit 114, and the display unit 116 may form part of a first device. While a remaining of the processor 102, the wearable camera 104, the item detection unit 106, the gaze detection unit 108, the communication unit 110, the recommendation unit 112, the data storage unit 114, and the display unit 116 may form part of at least one further device.

In the following paragraphs, non-limiting examples of the system 100 implemented in a distributed manner are being explained.

Figure 2:
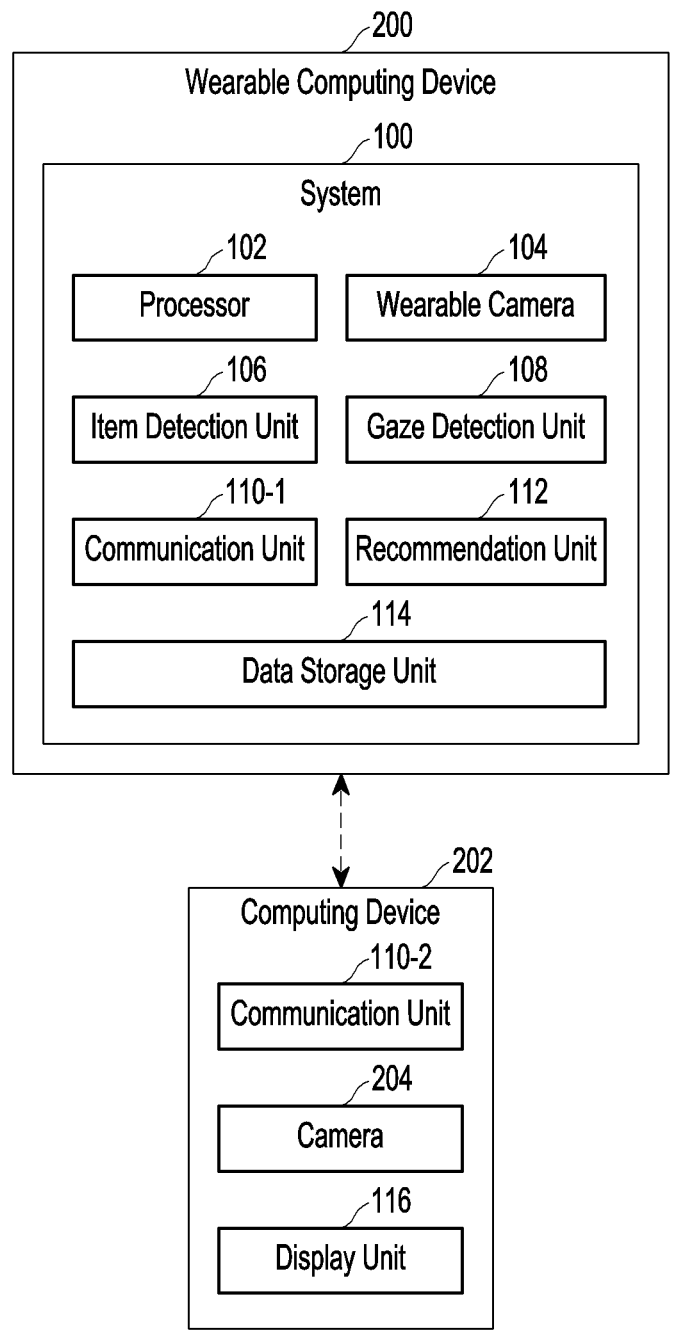
FIG. 2 illustrates computing devices according to another embodiment.

FIG. 2 illustrates an implementation of the system 100 in accordance with an embodiment. As shown in FIG. 2, the system 100 may be implemented in a wearable computing device 200 and may include the processor 102, the wearable camera 104, the item detection unit 106, the gaze detection unit 108, the communication unit 110-1, the recommendation unit 112 and the data storage unit 114. Examples of the wearable computing device 200 may include, but are not limited to, a smartwatch, a camera clip, an optical head mounted unit, and the like. In an example, the wearable computing device 200 is coupled with a computing device 202 of the user. The computing device 202 may be a smartphone, a laptop, a tablet, a personal computer, and the like and may include the communication unit 100-2, the camera 204 and the display unit 116. As described above with reference to FIG. 1, the system 100 may perform viewer gaze analysis and may subsequently provide recommendations related to the items.

In an example, the recommendations are displayed to the user using the computing device 202. In this example, the communication unit 110-1 transmits the recommendations generated by the recommendation unit 112 to the communication unit 110-2 of the computing device 202. Subsequently, the display unit 116 of the computing device 202 may display the recommendations to the user.

Figure 3:
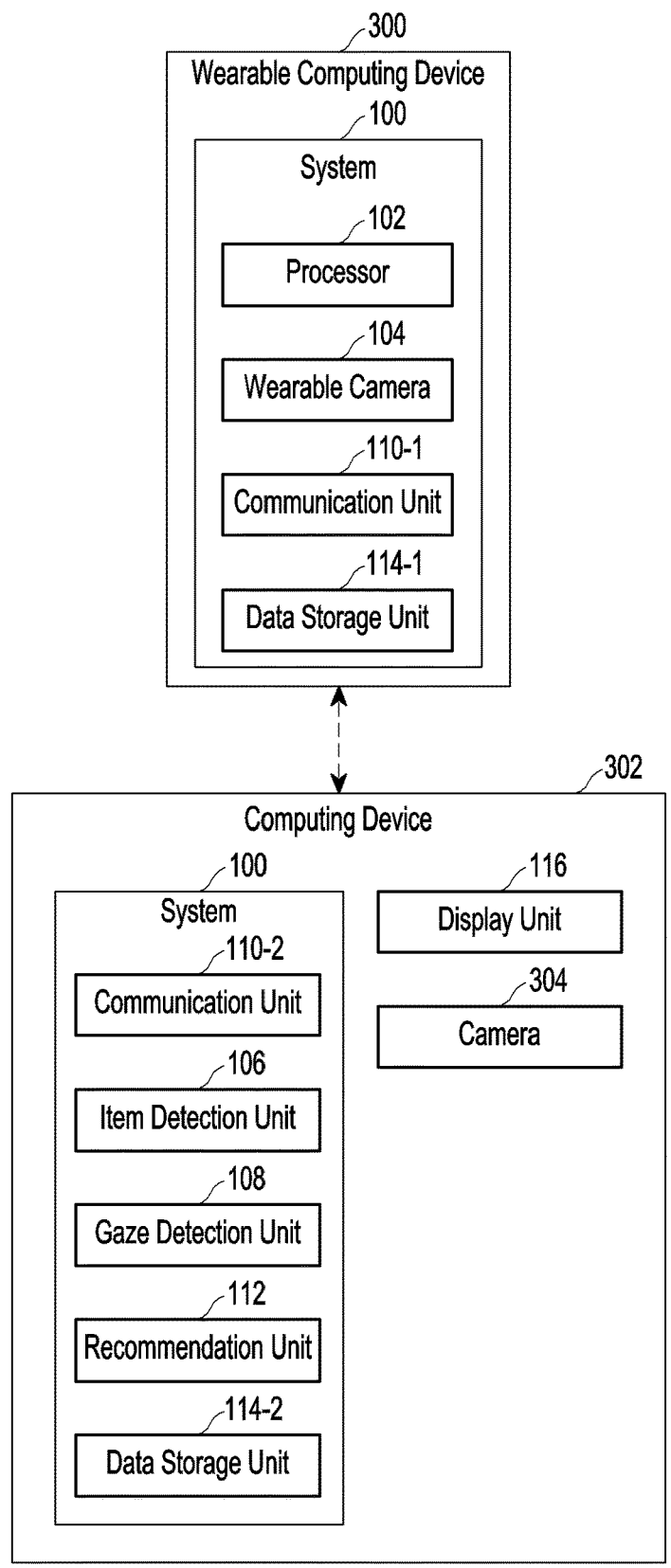
FIG. 3 illustrates computing devices according to yet another embodiment.

FIG. 3 illustrates an implementation of the system 100 in accordance with an embodiment. In this embodiment, the system 100 is implemented in a distributed manner. As shown in FIG. 3, a wearable computing device 300 includes the processor 102, the wearable camera 104, the communication unit 110-1, and the data storage unit 114-1. Further, as shown in FIG. 3, a computing device 302 includes the communication unit 110-2, the item detection unit 106, the gaze detection unit 108, and the recommendation unit 112. Further, the computing device 302 includes the display unit 116 and a camera 304.

In an implementation, the wearable camera 104 of the wearable computing device 300 may be used for capturing an image of the user. The captured image is then transmitted to the computing device 302 using the communication unit 110-1. On receiving the image, the computing device 302 performs the configuration of the system 100 in a manner as described above in FIG. 1.

In another implementation, the image of the user may be captured using the camera 304 of the computing device 302 and the configuration of the system 100 may be performed based on the captured image.

In an implementation, subsequent to the configuration of the system 100, the system 100 may be implemented for viewer gaze analysis. In this implementation, the wearable computing device 300 may be configured to capture and transmit images of the viewers to the computing device 302. Subsequent processing of the images for viewer gaze analysis may be performed by the computing device 302, in a manner as described above in FIG. 1. Further, the recommendations may be generated on the computing device 302 and subsequently displayed to the user through the display unit 116.

Figure 4:
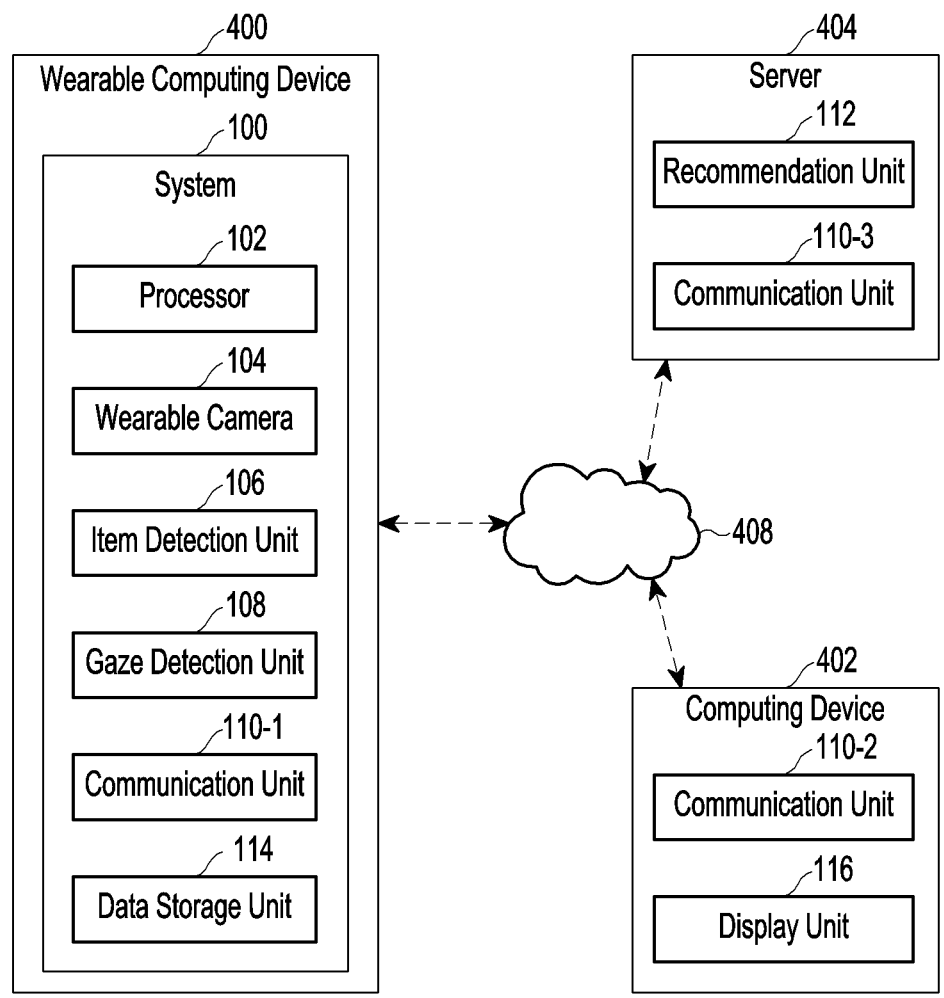
FIG. 4 illustrates computing devices according to another embodiment.

FIG. 4 illustrates an environment implementing the system 100, in accordance with an embodiment. The environment includes a wearable computing device 400, a computing device 402, and a server 404. The wearable computing device 400 includes the processor 102, the wearable camera 104, the item detection unit 106, the gaze detection unit 108, the communication unit 110-1 and the data storage unit 114. The computing device 402 includes the communication unit 110-2 and the display unit 116. In this embodiment, the recommendation unit 112 is provided in the server 404. The server 404, in an example, may be implemented by enterprises such as fashion enterprises, garment enterprises, and e-commerce enterprises for providing item recommendations to the users based on the gaze data. The server 404 further includes the communication unit 110-3.

Further, in this environment, the wearable computing device 400, the computing device 402, and the server 404 may interact with each other using a network 408. The network 408 may be a wireless network, a wired network, or a combination thereof. The network 408 can also be an individual network or a collection of many individual networks, interconnected with each other and functioning as a single large network, such as, for example, the Internet or an intranet. The network 408 can be implemented as one of different types of networks such as intranet, local area network (LAN), wide area network (WAN), the internet, and the like. Furthermore, the network 408 may implement various wired or wireless communication protocol such as Bluetooth and/or Wi-Fi, for facilitating interconnection between various network devices and other devices connected through the network 408.

In an implementation, the wearable computing device 400 may be implemented for capturing viewers' gazes towards items of the user. Based on the captured gazes, the wearable computing device generates the gaze data. The gaze data thus generated may be used for providing recommendations related to the items to the user. In an example, the communication unit 110-1 may transmit the gaze data to the server 404. On receiving the gaze data through the communication unit 110-3, the recommendation unit 112 may analyze the gaze data in a manner as described above in FIG. 1. Based on the analysis of the gaze data, the recommendation unit 112 may generate recommendations related to the items for the user. In an example, the communication unit 110-2 may transmit the recommendations to the computing device 402. In an example, the communication unit 110-2 may receive the recommendations. Thereafter, the recommendations may be displayed to the user using the display unit 116.

Figure 5:
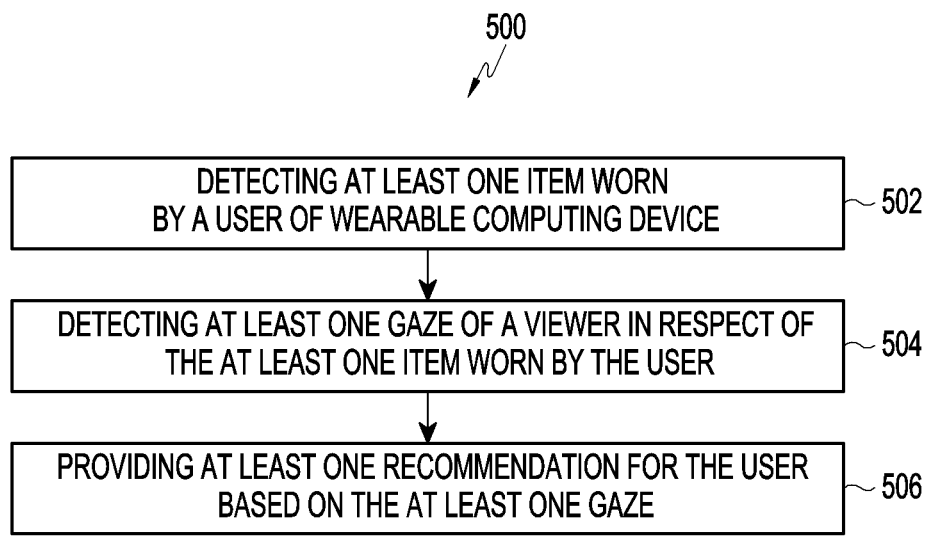
FIG. 5 illustrates an exemplary method for providing recommendations to users according to an embodiment.
Figure 6:
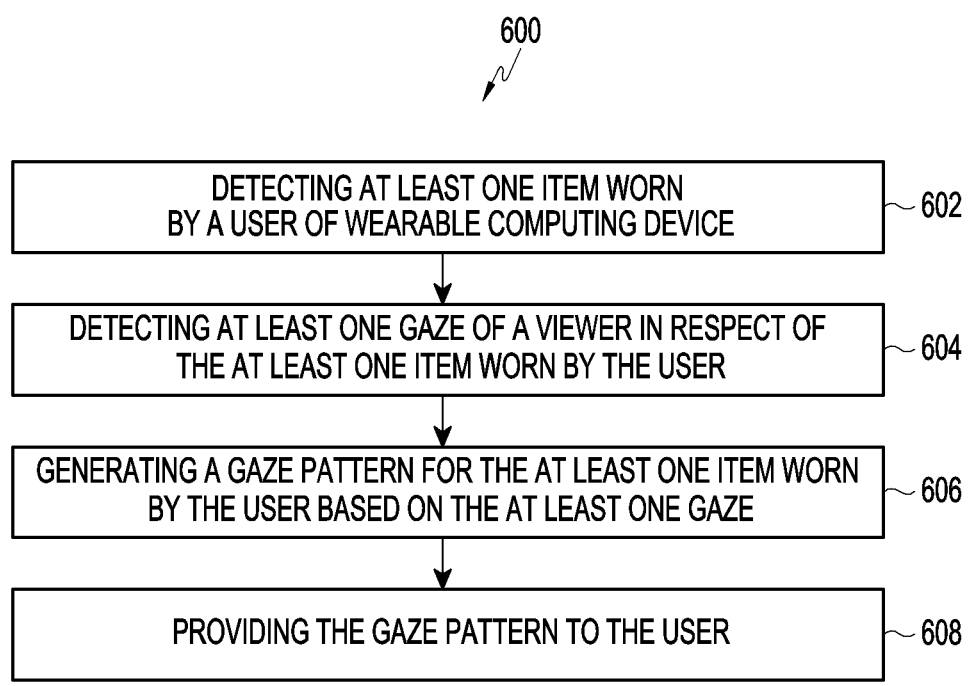
FIG. 6 illustrates an exemplary method for displaying gaze patterns to users according to another embodiment.

FIG. 5 illustrates an exemplary method 500 for providing recommendations to users according to an embodiment. FIG. 6 illustrates an exemplary method 600 for displaying gaze patterns to users according to an embodiment. The order in which the methods 500 and 600 are described is not to be construed as a limitation, and any number of the described method blocks can be combined in any order to implement the methods 500 and 600, or an alternative method. Additionally, individual blocks may be deleted from the methods 500 and 600 without departing from the scope of the inventive concept described herein. Furthermore, the methods 500 and 600 can be implemented in any suitable hardware, software, firmware, or combination thereof.

Referring to FIG. 5, at block 502, at least one item worn by a user of a wearable computing device is detected. In an example, the item detection unit 106 may detect the at least one item. The at least one item worn by the user may be detected based on an image of the user. For instance, the image stored in a storage may be accessed and subsequently, a plurality of items may be identified based on the image. In an example, an image recognition technique may be implemented for detecting the plurality of items. Thereafter, a list of the items may be presented to the user and selection of the at least one item may be received. The at least one item, in an example, may be mapped onto at least one virtual body zone from a plurality of body zones. The plurality of virtual body zones may compose a gaze plane constructed based on the image as described in FIG. 1.

In an example, prior to detecting the at least one item worn by the user, a gaze plane may be constructed based on the image of the user. The gaze plane comprises a plurality of rectangular grids. From the plurality of grids, the grids falling onto the user's physical structure or body may be identified and marked. The marked grids are used later for viewer gaze analysis. Additionally, user's dimensions, such as a height and width of the user may be determined based on one of the image and a user input. Further, in an example, a position of the wearable computing device may be detected based on the image and the user input.

At block 504, at least one gaze of a viewer in respect of the at least one item worn by the user is detected. In an example, an image of the eyes of the viewer may be captured. Subsequently, pupil of the viewer may be identified by implementing pupil detection techniques on the image of the viewer. Further processing may be performed for determining a look-at position of the viewer. Based on the look-at position, it is identified whether the viewer is looking at the at least one item or not. In a case where the look-at position is on the at least one item, it is detected that the at least one gaze of the viewer is in respect of the at least one item worn by the user. In an example, the detection of the gaze may be based on one or more parameters or factors, such as a distance of the viewer from the user, a viewing angle of the viewer, and a threshold time period. Further, parameters may include an area of the at least one virtual body zone, at least one hardware specification of a device in which the system 100 is implemented, and the user defined rules as described above with reference to FIG. 1.

The aforementioned parameters may affect the detection of the gaze at various stages of gaze detection, as described above in reference to FIG. 1. In an example, the gaze detection module 108 may detect the at least one gaze in respect of the at least one item worn by the user.

At block 506, at least one recommendation for the user is provided based on the at least one gaze. In an example, the at least one recommendation may be a recommendation to wear the at least one item based on at least one gaze parameter. For instance, the at least one recommendation may be a recommendation to wear a specific shirt to a mall. In another example, the at least one recommendation may be a recommendation to wear the at least one item for an upcoming event. In a further example, the at least one recommendation may be a recommendation to purchase a further item. In an example, the at least one recommendation may be a cumulative personality index associated with the at least one item. In an example, the at least one recommendation may be provided by analyzing gaze data. The gaze data may include previously recorded gaze patterns associated with the items worn by the user. In an example, the recommendation unit 112 may provide the at least one recommendation for the user based on the at least one item worn by the user.

Referring to FIG. 6, blocks 602 and 604 are analogous to blocks 502 and 504, respectively, and are performed in a manner as described above. Referring to block 606, a gaze pattern for the at least one item worn by the user is generated based on the at least one gaze. In an example, at the time of detection of the gaze, at least one gaze parameter associated with the gaze may be recorded. For example, the gaze duration of the at least one gaze, a location of the user when the at least one gaze is detected, a face shot of the viewer, and a body shot of the viewer may be recorded. In another example, along with the aforementioned parameters, a time associated with the at least one gaze, a facial expression of the viewer associated with the at least one gaze, and an audio of the viewer associated with the at least one gaze may be recorded. In a further example, an identity, for example, a name of the viewer, a gender of the viewer, and a gaze identity of the at least one gaze may also recorded. The at least one gaze parameter along with the gaze is stored as gaze pattern. In an example, the gaze detection unit 108 may generate the gaze pattern based on the at least one gaze. In an example, based on the gaze pattern and the at least one gaze parameter, gaze data may be updated. The gaze data may include previously recorded gaze patterns.

In an example, the gaze data recorded above may be used for providing at least one recommendation related to the item to the user. In this example, the gaze data may be analyzed, for example, based on one or more gaze parameters selected by the user, and accordingly a recommendation may be provided.

At block 608, the gaze pattern is provided to the user. The gaze pattern may include details related to the item. For example, the gaze pattern may include, a number of gaze hits related to the item. For each of the gaze hits, the gaze pattern may include further details such as a location of the user, a time of the day, a duration of the gaze, a gender of the view, an image of the viewer, and the like. In an example, the gaze pattern may be provided to the user through the display unit 116.

Figure 7:
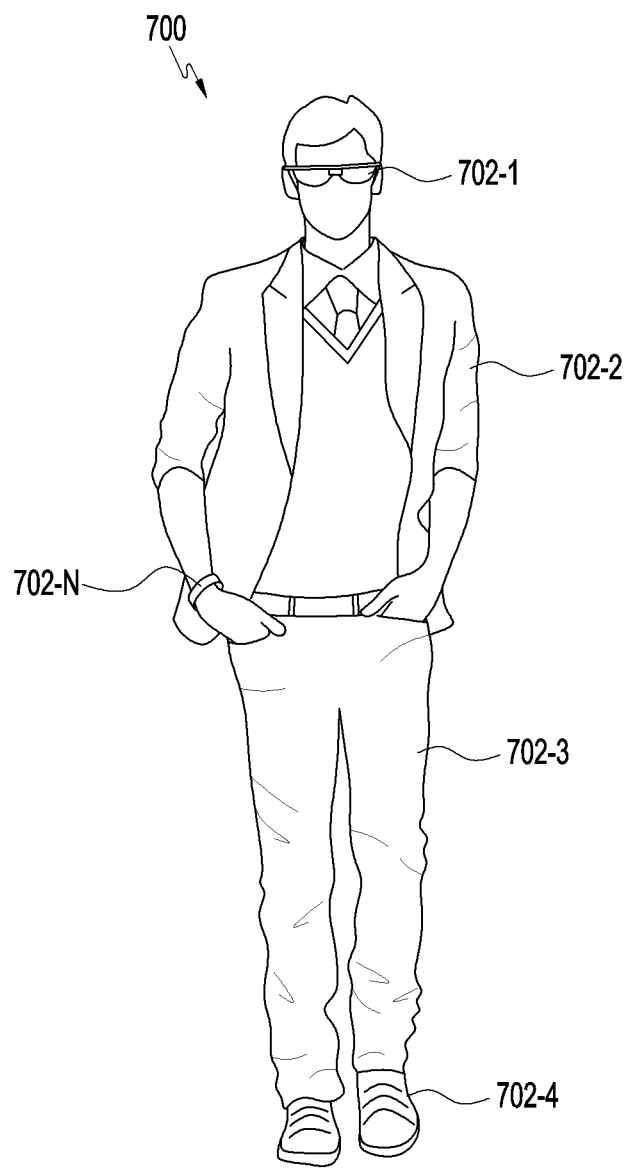
FIG. 7 illustrates a user and a plurality of items of the user.

FIG. 7 illustrates a user 700 and a plurality of items 702-1, 702-2, 702-3, 702-4, . . . , 702-N of the user 700. The plurality of items 702-1, 702-2, 702-3, 702-4, . . . , 702-N may collectively be referred to as items 702 and individually be referred to as item 702. Examples of the items 702 may include, but are not limited to, eyeglasses, earbuds, jewelry, rings, ankle bands, shoes, smart shoes, wristbands, wristwatches, tattoos, clothing, jacket, shirt, belt, tie, trouser, sandals, LED clothing, and the like. In accordance with the principles of the present disclosure, gaze received from viewers towards the items 702 may be captured and, stored in a mapped relationship with the items 702 in a database. For instance, all viewer gazes received in respect of the user 700's wristwatch may be mapped to the wristwatch and stored in the database. Similarly, all viewer gazes received in respect of the items 702 are stored in mapped relationship with respective items 702 in the database. In addition to the mapping of the gaze, the gaze parameters related to the gaze may also be recorded. As mentioned above, the gaze parameters include a gaze duration, a location where the gaze is detected, a face shot of the viewer, and a body shot of the viewer. Further, the gaze parameters may also include a time at which the gaze was recorded, a facial expression of the viewer, an audio of the viewer, an identity of the viewer, a gender of the viewer, and a gaze identity associated with the gaze. Further, in an example, for each gaze received with respect to an item 702, a corresponding gaze counter is updated. Thus, number of gazes received in respect of the item 702 is recorded. Data thus collected, herein referred to as gaze data, may subsequently be used for providing recommendations to the user 700.

In an example, the recommendations may be provided based on the gaze parameters. For example, the user may seek recommendations related to items that he can wear to workplace. In this example, the user 700 may select the location as workplace. Based on the received location and the gaze counters corresponding to the items 702, recommendations related to the items 702 may be provided to the user 700. For instance, a shirt, a trouser, a belt, a wristwatch, and a foot wear having highest corresponding gaze counters may be identified and provided as recommendations to the user 700.

Figure 8:
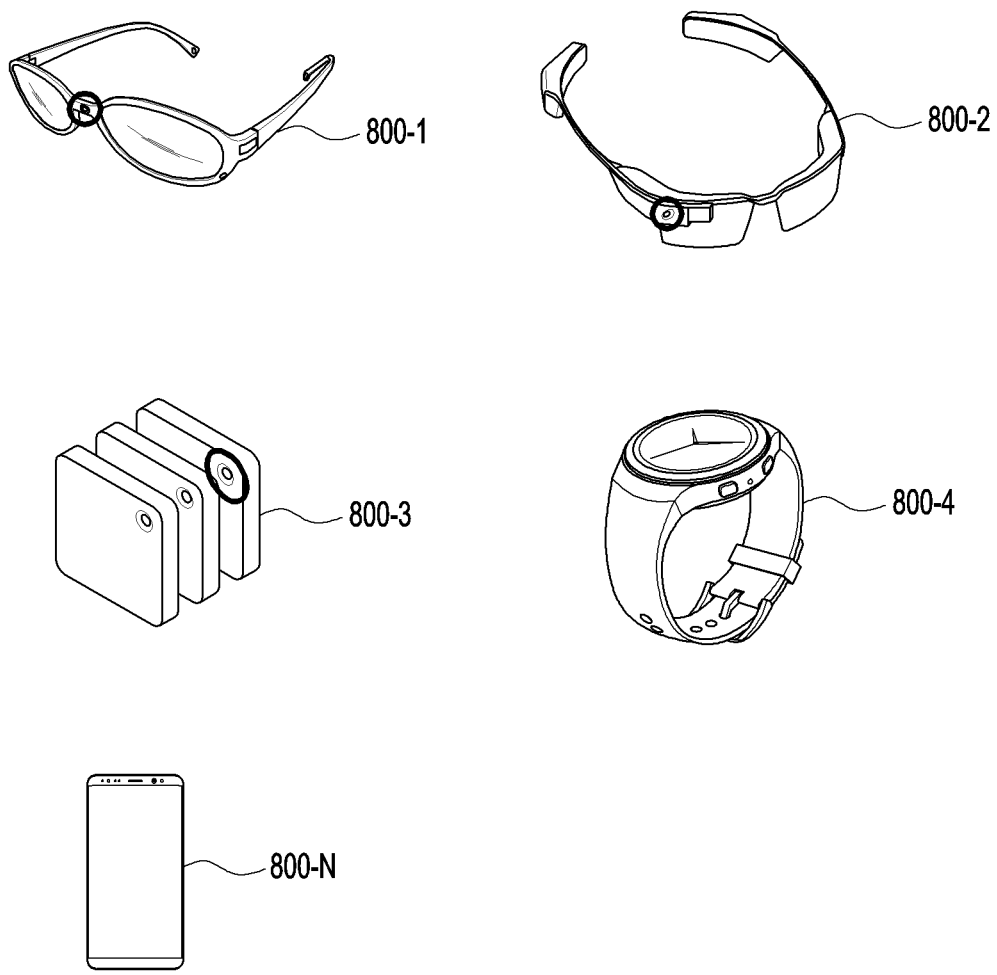
FIG. 8 illustrates a plurality of exemplary devices for implementing the system of FIG. 1.

FIG. 8 illustrates a plurality of devices 800-1, 800-2, 800-3, 800-4 . . . , 800-N that may be used for implementing the system 100. The plurality of devices 800-1, 800-2, 800-3, 800-4 . . . , 800-N may collectively be referred to as devices 800 and individually be referred to as device 800. In an example, the devices 800 may include wearable computing devices, such as camera glasses, camera clips, smartwatches, and the like. In another example, the devices 800 may include computing devices such as, smartphones, tablets, personal digital assistants (PDAs), laptops, workstation computers, personal computers, and the like. In yet another example, the devices 800 may include a server (not shown in FIG. 8). The server may be implemented by enterprises such as garment/fashion industries and e-commerce industries to render recommendation services to the users.

Figure 9A:
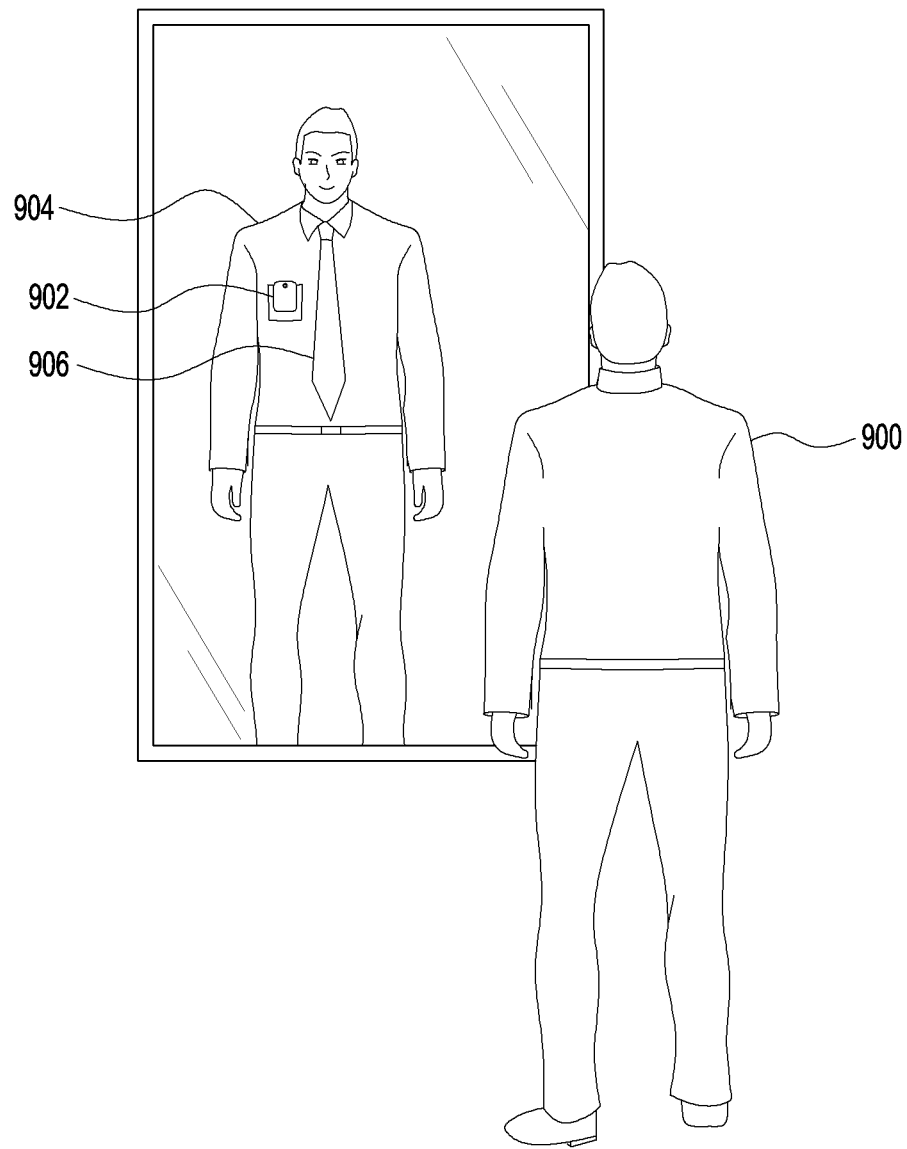
FIGS. 9A-9D illustrate configuration of the system of FIG. 1 according to embodiments.

FIGS. 9A-9D illustrate configuration of system 100, according to embodiments. Referring to FIG. 9A, a user 900 may wear a wearable computing device 902, as shown in FIG. 9A. Using a camera of the wearable computing device 902, the user 900 may click an image 904 of himself. The image 904, in an example, may be processed in a manner as described above for configuring the system 100. For instance, based on the image 904, a gaze plane may be constructed. Further, user's dimensions, such as a height and a width of the user 900 may be determined. Furthermore, a position of the wearable computing device 902 and at least one item 906 worn by the user may be detected.

Figure 9B:
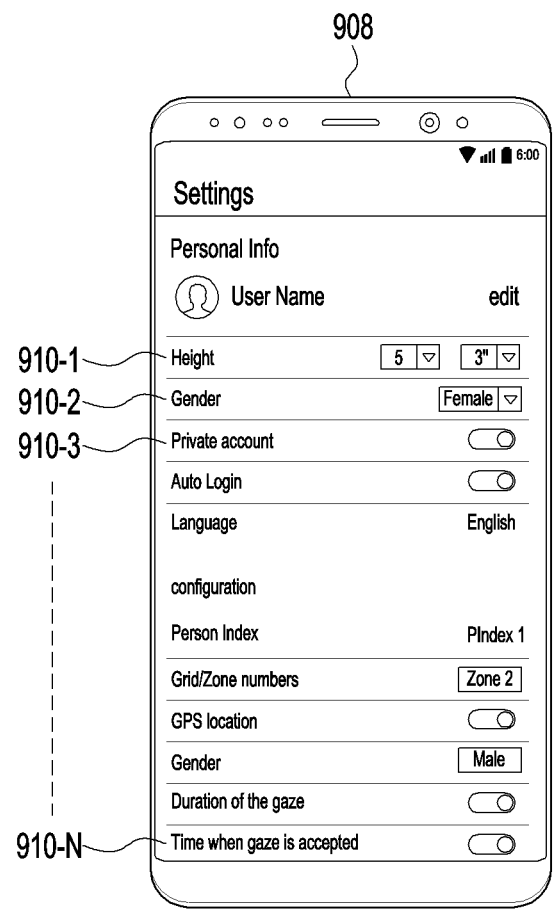

Referring to FIG. 9B, the system 100 may be configured semi-automatically using a computing device 908 such as a smart phone. In an example, for configuring the system 100, the user may be provided a plurality of options 910-1, 910-2, 910-3, . . . , 910-N. The plurality of options 910-1, 910-2, 910-3, . . . , 910-N may collectively be referred to as options 910 and individually be referred to as option 910. As shown in FIG. 9B, using the options 910, the user may specify a height and a gender. Further, the user may select a language, define privacy level, and select auto-login service through the options 910. Furthermore, the user may select a person index, select a zone corresponding to the position of the wearable computing device, select location settings, and time based settings corresponding to the gaze using the options 910.

Figure 9C:
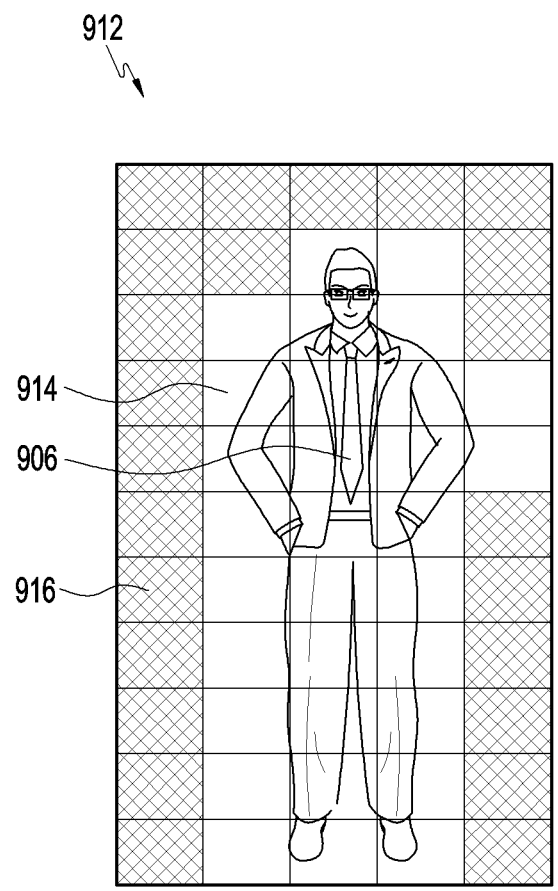

Referring to FIG. 9C, a gaze plane 912 is shown. The gaze plane 912 comprises grids 914 and grids 916. The grids 914 represent grids falling on the user's body. The grids 916 represent grids not falling on the user's body. For the sake of brevity, only one grid 914 and one grid 916 has been marked in FIG. 9C. In an example, only the grids 914 may be used for performing the viewer gaze analysis as explained above. The term grids may interchangeably be referred to as virtual body zones.

Figure 9D:
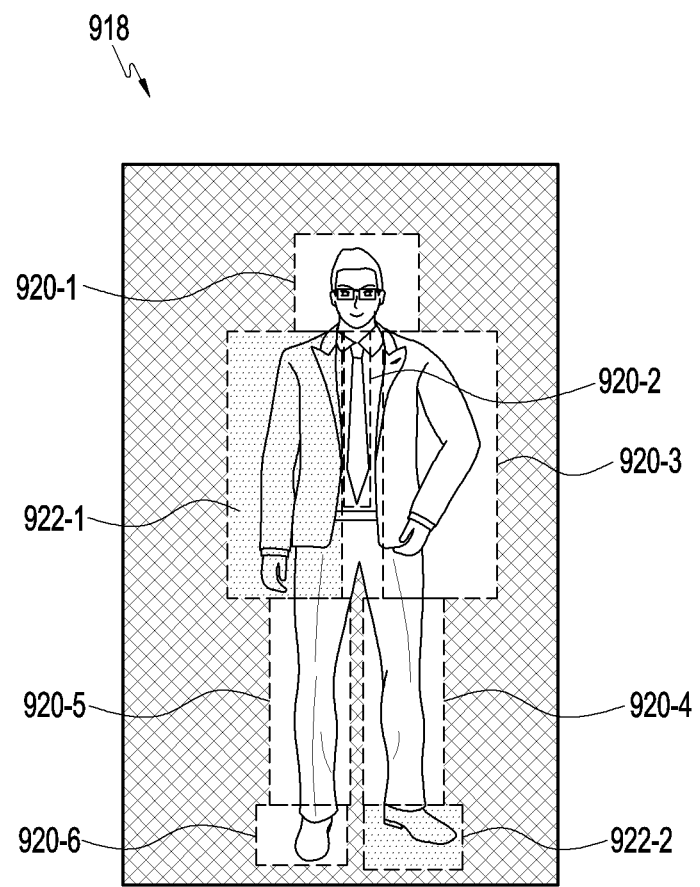

Referring to FIG. 9D, a customized gaze plane 918 is shown. The customized gaze plane 918 is a gaze plane comprising user-selected grids that are to be used for viewer gaze analysis. As shown in FIG. 9D, the user may select grids 920 and may discard grids 922. The selected grids 920 are subsequently considered for viewer gaze analysis.

Figure 10:
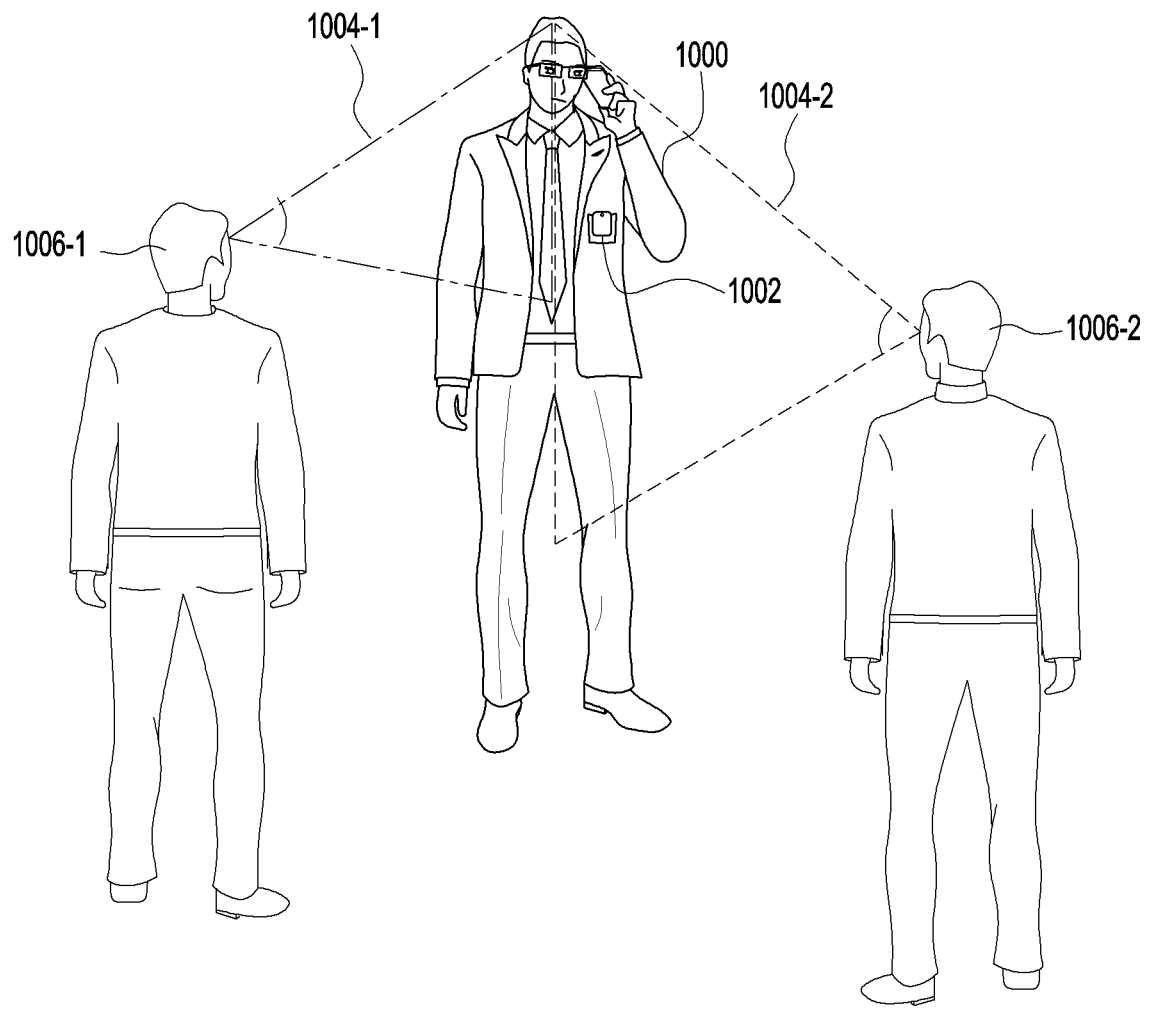
FIG. 10 illustrates capturing of viewer gazes towards items worn by a user.

FIG. 10 illustrates capturing of viewer gazes towards items worn by a user. As shown in the FIG. 10, a user 1000 may wear a wearable computing device 1002. The wearable computing device 1002, in an example, may capture gazes 1004-1 and 1004-2 from viewers 1006-1 and 1006-2, respectively. Based on the captured gazes, a look at position of the gazes 1004-1 and 1004-2 may be determined. Subsequently, the gazes 1004-1 and 1004-2 may be mapped with an item onto which the gazes 1004-1 and 1004-2 fall. Although only one wearable computing device 1002 has been shown in FIG. 10, as may be understood, more than one wearable device 1002 may be implemented by the user 1000. In an example, one or more wearable computing devices implemented by the user may communicate with each other to capture the gazes from the viewers.

Figure 11:
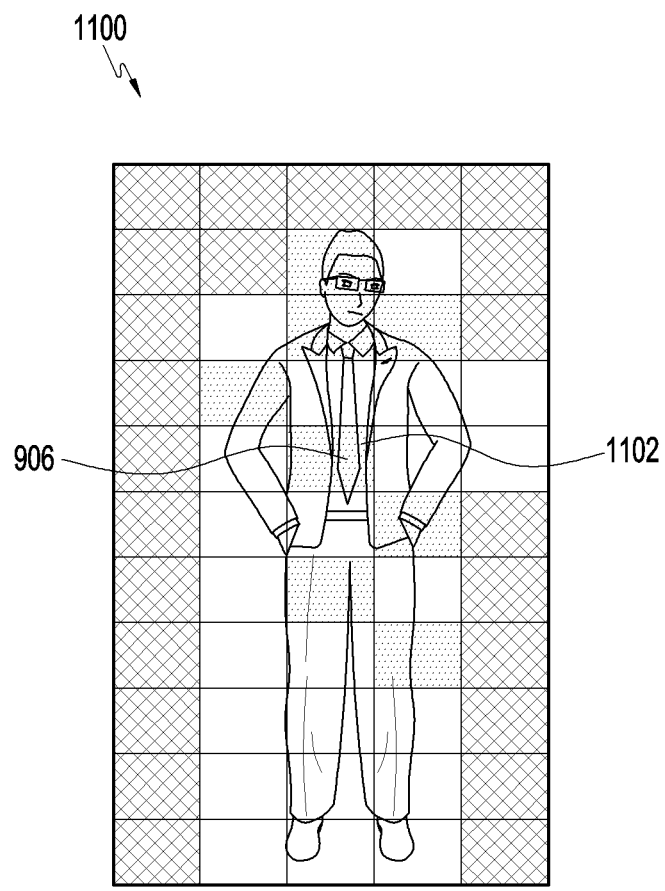
FIG. 11 illustrates marking of a gaze from a viewer towards an item of the user.

Referring to FIG. 11, marking of a gaze from a viewer (not shown in the FIG. 11) towards the item 906 of the user is shown. For the sake of brevity, mapping of only one gaze is shown in FIG. 11. In FIG. 11, a gaze plane 1100 similar to the gaze plane 912 is shown. As shown in the gaze plane, a gaze from the viewer towards the item 906 of the user is mapped onto a grid 1102. The grid 1102 represents a grid where the look-at position of the gaze falls on the gaze plane. Further, the grid 1102 forms part of a set of grids corresponding to the item 906. Accordingly, the gaze is mapped to the item 906. Similarly, other gazes from the viewer towards the user are marked in a similar manner.

After configuring of the device and capturing of the gazes from the viewers, the user may access results of the viewer gaze analysis through an application provided on a computing device of the user. Following description illustrates graphical user interfaces (GUIs) of the application.

Figure 12:
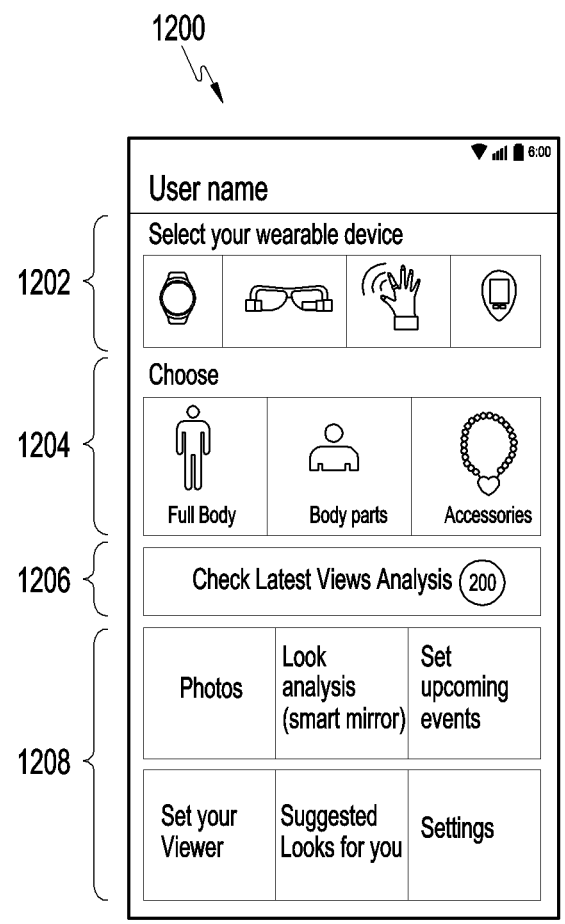
FIGS. 12-18, 19A and 19B illustrate graphical user interfaces (GUIs) of an application provided on a computing device of a user.

FIGS. 12-18, 19A and 19B illustrate graphical user interfaces (GUIs) of an application provided on the computing device of the user. In an example, the user may access the application to view various results related to viewer gaze analysis. Referring to FIG. 12, a GUI 1200 is shown. The GUI 1200 illustrates a home screen of the application. As shown in FIG. 12, the GUI 1200 provides the user with various options. For example, options 1202 provide the user with option to select a wearable computing device of the user. In an example, after selection of the wearable computing device, the user may configure the selected wearable computing device. In another example, post selection of the wearable computing device, the user may be presented with viewer gazes captured through the selected wearable computing device.

Options 1204 provide the user with an option to select a region to view corresponding gazes. For instance, as shown in FIG. 12, the user may be provided with an option to view gazes received in respect of the whole body of the user. In another example, the user may select an option to view gazes received in respect of specific body part(s). In yet another example, the user may select an option to view gazes received in respect of the accessories of the user. Option 1206 provides the user with an option to viewer gaze analysis done in respect of a latest look of the user. In an example, the option may also display a number indicative of overall gaze hits received for the latest look of the user. As shown in FIG. 12, the user has received 200 gaze hits for his latest look. Upon selecting the option 1206, the user may be presented with gaze hits received in respect of each item of the user in the look, in a bifurcated manner.

Options 1208 provide the user with various other options. For instance, the user may be presented with an option to view photos of different wearable items of the user along with gaze hits received for each of the items. In another example, the user may be provided with an option to look analysis. Further, the user may be provided with an option to configure upcoming events. After configuration of an event, the user may be provided with a recommendation/suggestion related to an outfit comprising of a plurality of wearable items that the user may wear to the event. In an example, the outfit may include wearable items from the wardrobe of the user. In another example, the outfit may include one or more wearable items not yet owned by the user. In this example, the user may be provided with one or more source(s), for example, online links and store addresses, from where the user may purchase the wearable items. In another example, the outfit may include a mix of both the items owned by the user and the items not yet owned by the user. In this case, as mentioned previously, sources for purchasing the items not yet owned by the user may be provided to the user.

Furthermore, the user may be provided with an option to select viewers whose gazes are to be captured. In an example, using this option, the user may select one or more viewers, for example, friends and family members, whose gazes are to be captured. In another example, the user may select a gender using this option. In this case, only gazes from viewers of selected gender may be captured.

Furthermore, the user may be presented with an option to view one or more suggested/recommended outfits/looks. Using this option, the user may view recommended looks/outfits. In an example, once the user has selected the aforementioned option, the user may be provided with a further option whereby the user may filter the looks/outfits by parameters, such as location, event, and the like. As an example, the user may filter options based on location, e.g., mall, and may receive recommendations related to looks/outfits best suited for mall.

Furthermore, the user may be presented with an option whereby the user may view and get an analysis of an outfit/look based on stored gaze data. In this case, the user may wear an outfit/look and may subsequently capture an image of himself. Based on the captured image, the wearable items may be detected and subsequently analyzed based on the stored gaze data. For instance, similar wearable items and corresponding gaze hits for such similar wearable items may be analyzed. Accordingly, it is determined whether the outfit/look would suit the user or not. Further, the user may be presented with an option to access and modify settings. Using this option, the user may customize personal and application's configuration to view specific results.

Figure 13:
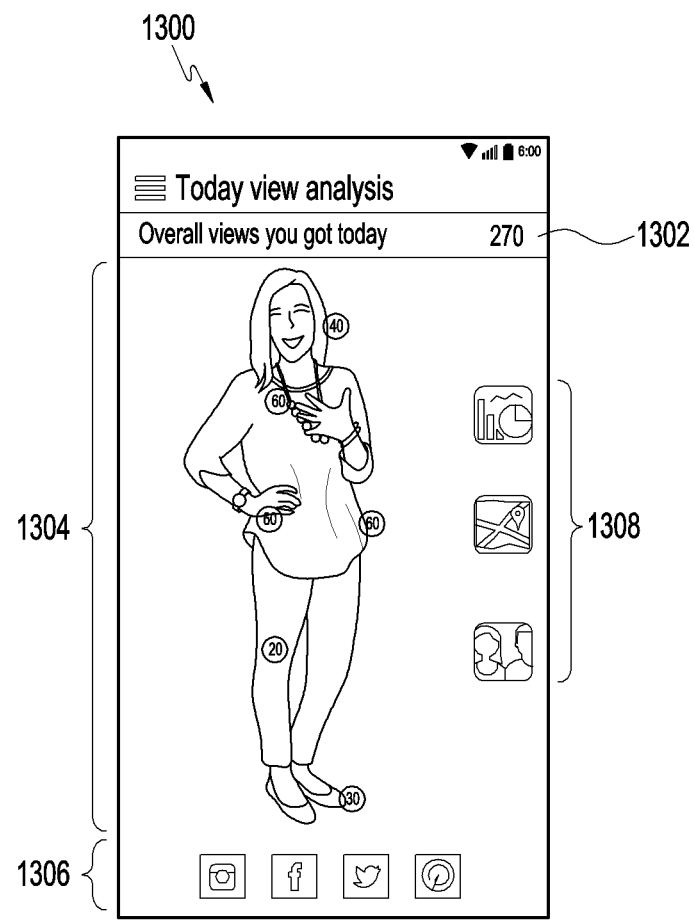

Referring to FIG. 13, a GUI 1300 is shown. The GUI 1300 provides the user with an analysis of a look/outfit that the user has worn today. For instance, an indicator 1302 indicates overall gaze hits that the user received for the look/outfit. Further, one or more indicators 1304 indicate gaze hits received in respect of various items of the user. For instance, as shown in FIG. 13, the user got 60 gaze hits for her watch, 20 gaze hits for her jeans, 30 gaze hits for her sandals, and so on and so forth. Furthermore, the GUI 1300 provides the user with option(s) 1306 for sharing the look/outfit analysis with other users through a plurality of social media platforms. Furthermore, the GUI 1300 provides the user with filtering and analysis options 1308. According to an option 1308, the user may filter the gaze hits based on gender of the viewers. According to another option 1308, the user may filter the gaze hits based on location. For instance, the user may have visited a mall and a coffee shop today. The user may choose to view only the gaze hits received in the coffee shop. Accordingly, the user may set the location to coffee shop. According to another option 1308, the user may view details related to gazes received with respect to a particular wearable item. For instance, the user may choose to view details related to gazes received in respect of her wristwatch. On receiving a selection of the wristwatch, the user may be presented with information including gaze parameters associated with each of the gazes received in respect of the wristwatch. For instance, a location, a gaze duration, a gender, a photo, a gaze ID, and the like, recorded with respect to the gaze may be displayed to the user.

Figure 14:
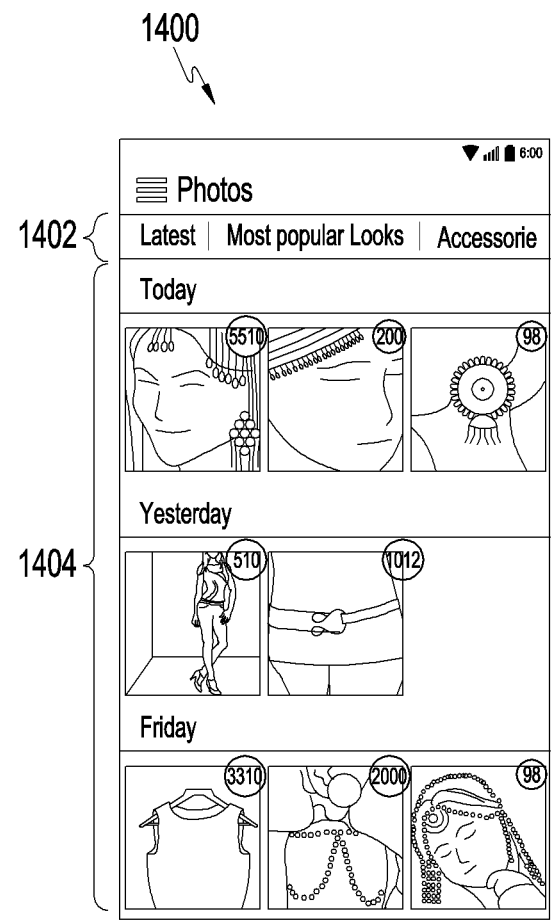

Referring to FIG. 14, a GUI 1400 is shown. The GUI 1400 provides the user with a plurality of photos of the user. The photos may include specific items of the user, complete look/outfit of the user, accessories of the user, and the like. In an example, through an option 1402 provided in the GUI 1400, the user may filter the photos presented to the user. For instance, the user may view the latest photos. In another example, the user may choose to view his/her most popular looks. In yet another example, the user may choose to view photos of his/her accessories. As shown in FIG. 14, the user may choose to view latest photos. Accordingly, a plurality of photos 1404 are displayed to the user. In an example, along with the photos, a gaze hit associated with each of the photos is displayed to the user. For instance, as shown in FIG. 14, a photo 1404 of an earring of the user has received 98 gazes from viewers.

Figure 15:
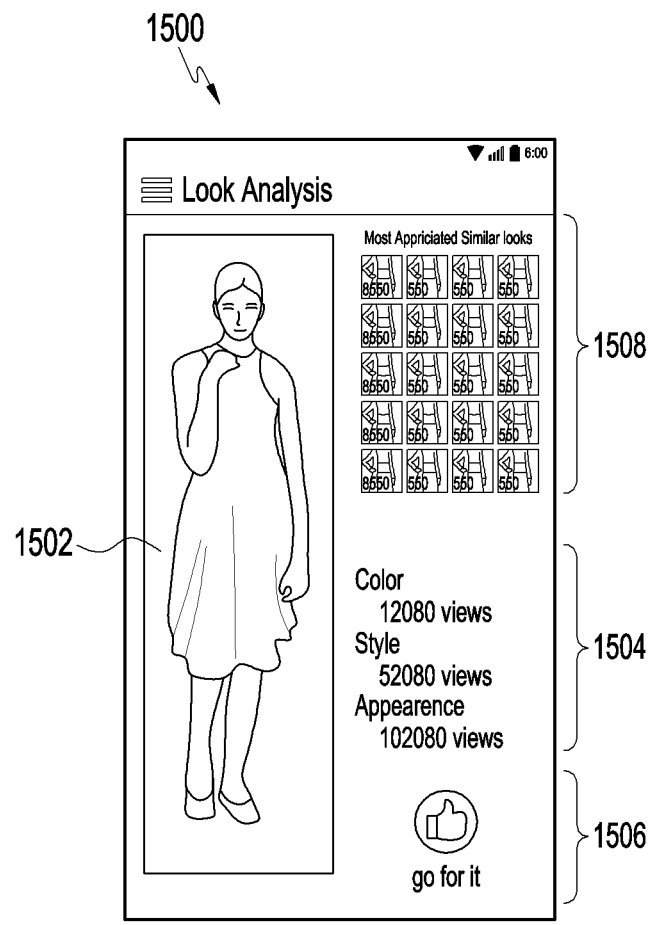

Referring to FIG. 15, a GUI 1500 is shown. The GUI 1500 provides the user with look analysis in respect of an item, an outfit, a look that the user may try. For instance, the user may want to learn about how a particular dress in a clothing store would look on her. To that end, the user may wear the dress and subsequently capture an image of herself. In an example, the image is analyzed based on the gaze data and, accordingly, the user is provided with analysis result. For instance, as shown in FIG. 15, the user may try a dress 1502. Based on the analysis, the user is presented with results section 1504. The results section 1504 may provide the user with gaze hits in respect of the dress. In addition, the user is provided with a recommendation 1506. Furthermore, in an example, the user may be presented with other recommendations 1508 related to other items that the user may try.

Figure 16:
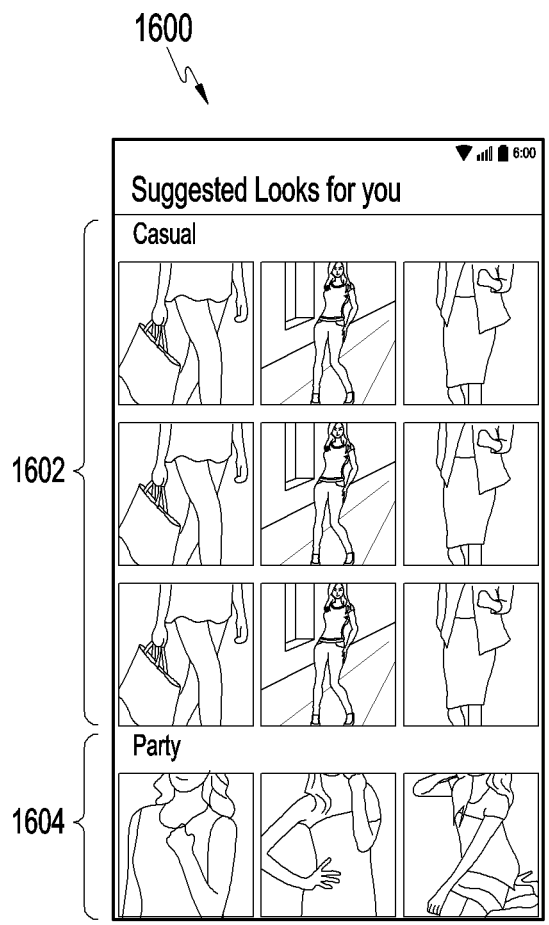

Referring to FIG. 16, a GUI 1600 is shown. The GUI 1600 provides the user with recommendations related to looks/outfits. In an example, the recommendations may be presented to the user based on a type of occasion/outing. For instance, as shown in FIG. 16, for a casual outing/event, a plurality of recommendations 1602 is presented to the user. Furthermore, for a party outing/event, a plurality of recommendations 1604 is presented to the user. The recommendations 1602 and 1604, as explained earlier, are based on the gaze data recorded by the system 100.

Figure 17:
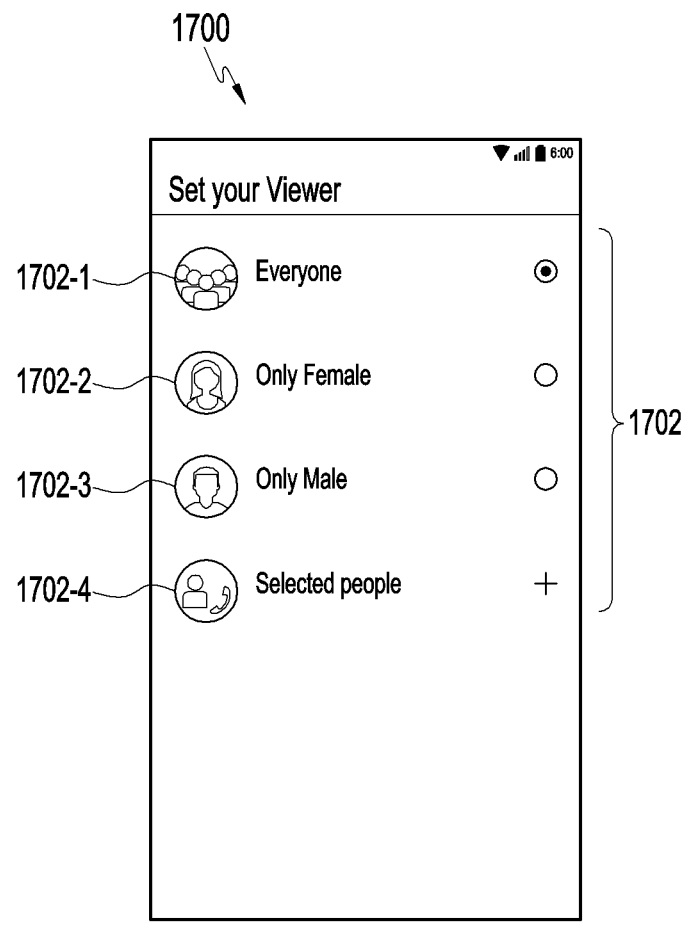

Referring to FIG. 17, a GUI 1700 is shown. The GUI 1700 provides the user with options 1702 to select a type of viewers whose viewer gazes are to be captured. In an example, the user may choose to capture viewer gazes from everyone by selecting option 1702-1. In another example, the user may choose to capture viewer gazes from only females by selecting option 1702-2. In another example, the user may choose to capture viewer gazes from only males by selecting option 1702-3. In yet another example, the user may choose to capture viewer gazes from selected people by selecting option 1702-4. Using the option 1702-4, the user may subsequently select people, for example, friends, family members, colleagues, and the like whose viewer gaze may be captured.

Figure 18:
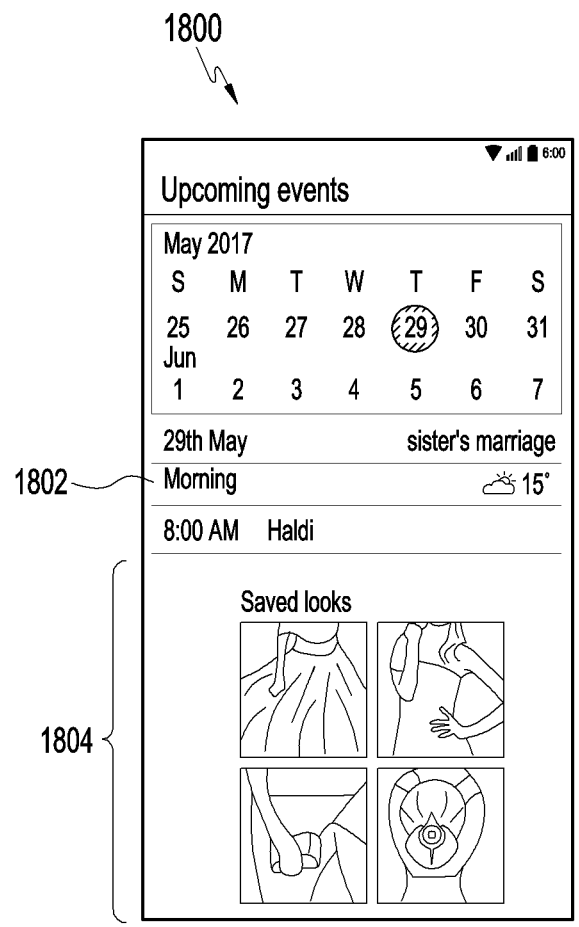

Referring to FIG. 18, a GUI 1800 is shown. The GUI 1800 provides the user with one or more recommendations related to upcoming events. For instance, as shown in FIG. 18, for an upcoming event 1802, e.g., a wedding event, one or more recommendations 1804 are provided to the user.

Figure 19A:
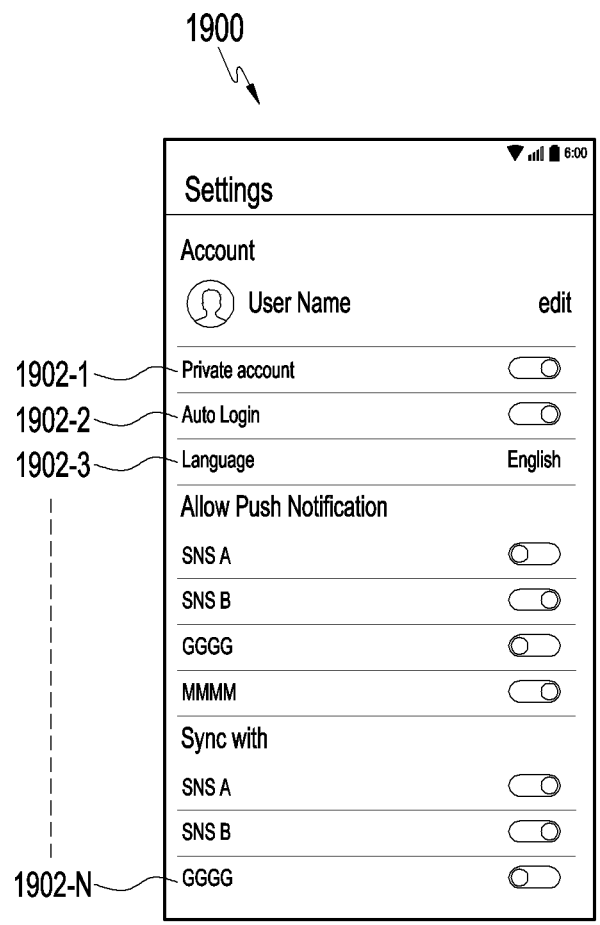

Referring to FIG. 19A, a GUI 1900 is shown. The GUI 1900 represents an example interface whereby the user may change one or more personal or application settings. For instance, as shown in FIG. 19A, the GUI 1900 provides the user with a plurality of options 1902-1, 1902-2, 1902-3, . . . , 1902-N, collectively referred to as options 1902. Using the options 1902, the user may change settings such as privacy settings, language settings, login settings, notification settings, contact sync settings, and the like. As an example, using the option 1902-N, the user may sync his e-mail contacts with the application. In another example, using the option 1902-3, the user may select a language of his/her preference.

Figure 19B:
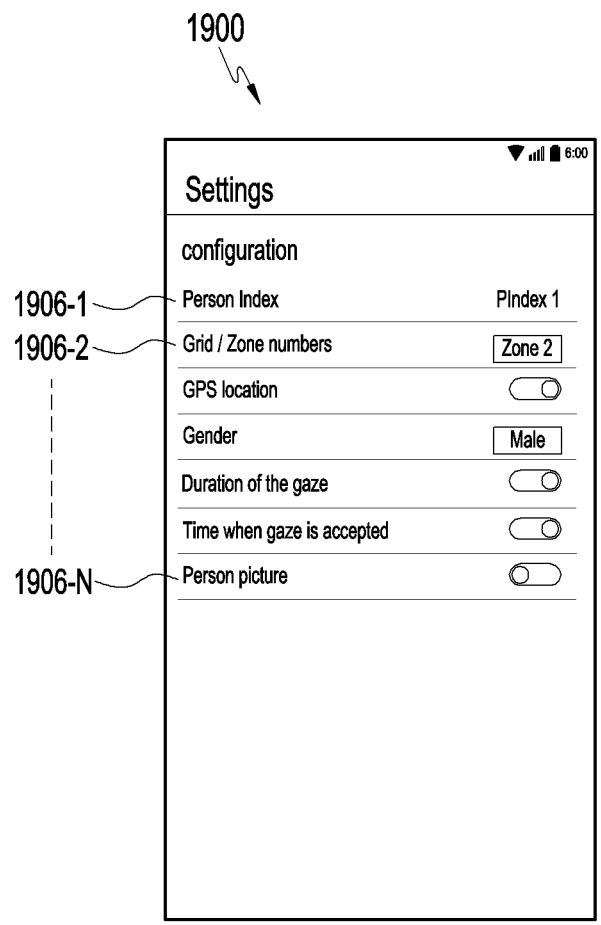

Referring to FIG. 19B, a GUI 1904 is shown. The GUI 1904 represents another example interface whereby the user may change one or more personal or application settings. As shown in FIG. 19B, the GUI 1904 provides the user with a plurality of options 1906-1, 1906-2, . . . , 1906-N, collectively referred to as options 1906. In an example, using the options 1906, the user may define/change settings related to the gaze parameters. For instance, the user may choose to enable an option 1906 whereby a time at which a gaze is detected is recorded. Similarly, in another example, the user may select an option 1906 whereby the location of the system 100 is recorded along with the gaze.

Figure 20A:
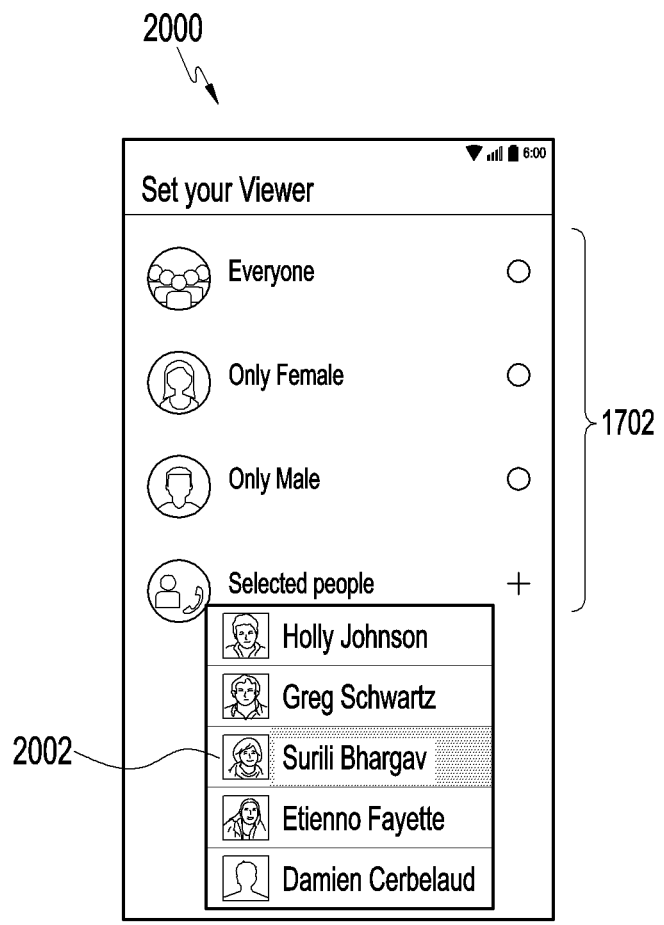
FIGS. 20A-20C illustrate a use case according to an embodiment.
Figures 20B, 20C:
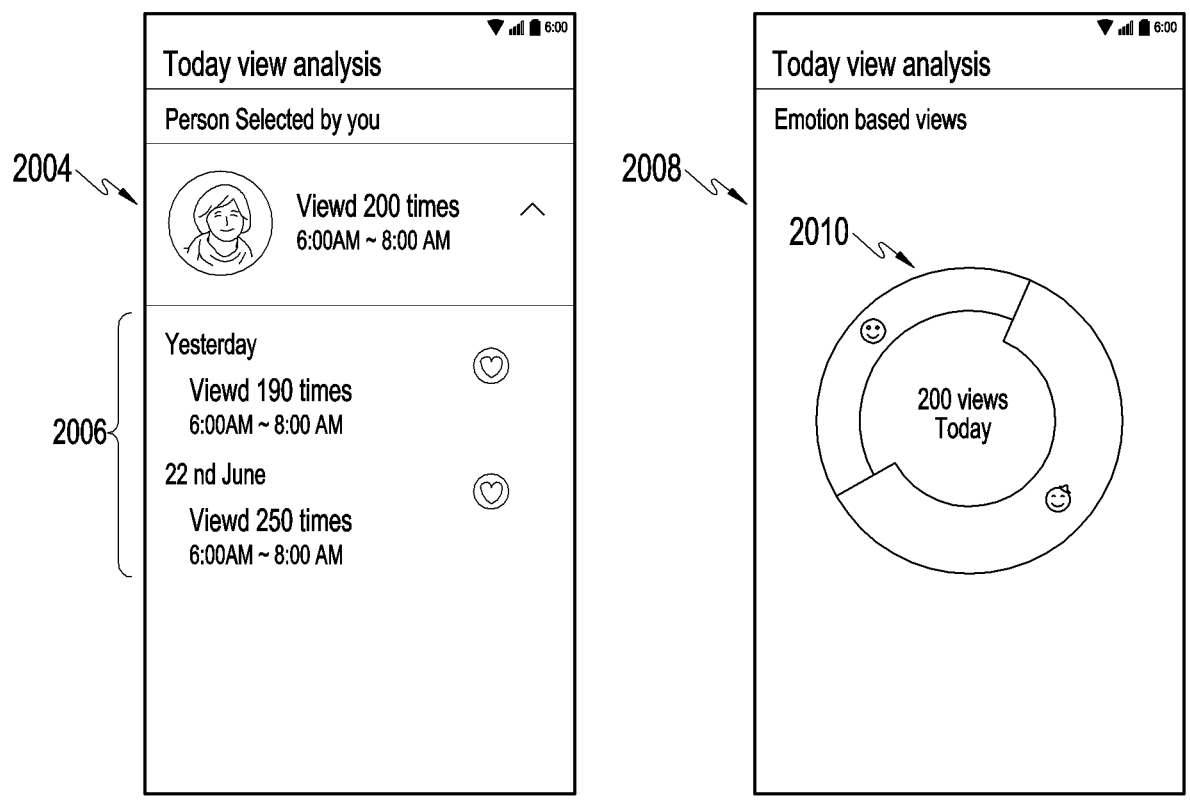

FIGS. 20A-20C illustrate a use case whereby the system 100 is implemented to capture viewer gazes from a specific user. Consider a case where a user A is of introvert nature and wishes to befriend a user B. In this case, the user A may select an option 2002, as shown in a GUI 2000 of FIG. 20A. The option 2002 enables capturing of viewer gaze of a specific user(s), user B in this case. On selecting the option 2002, viewer gazes received from user B are captured. Referring to FIG. 20B, a GUI 2004 illustrating result analysis 2006 of the viewer gazes received from user B is shown. As shown in FIG. 20B, the result analysis 2006 shows day-wise breakup of the gazes received from the user B. For instance, on $22^{nd}$ June, the user A received 250 gazes from the user B. As mentioned previously, in an example, the system 100 may record facial expressions and sounds from the viewers as gaze parameters. Such gaze parameters may be used for performing viewer gaze analysis. As an example, facial expressions and/or sound from the user B may be recorded while capturing the gazes. Accordingly, a graph depicting emotions of user B towards user A may be generated (illustrated in FIG. 20C). FIG. 20C illustrates a GUI 2008. The GUI 2008 includes a graph 2010 depicting emotions of the user B towards user A based on the gazes captured from user B. Based on the viewer gaze analysis as described above, the user A may proceed to befriend user B.

Figure 21A:
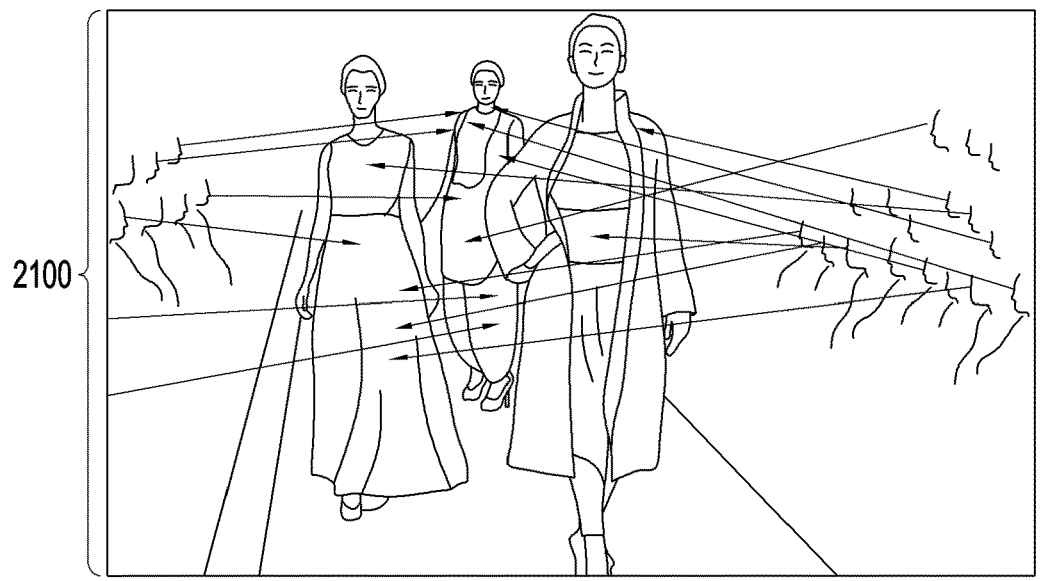
FIGS. 21A-21C illustrate a use case according to another embodiment.
Figure 21B:
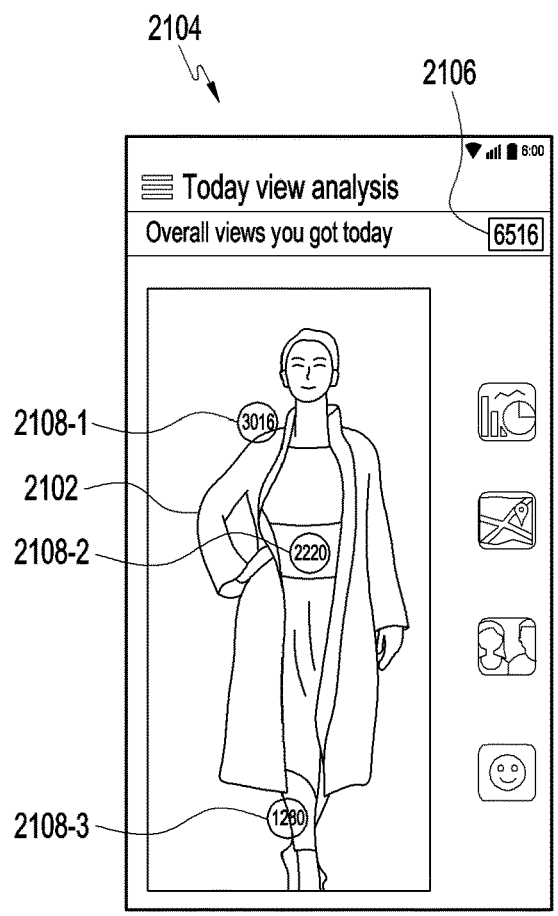
Figure 21C:
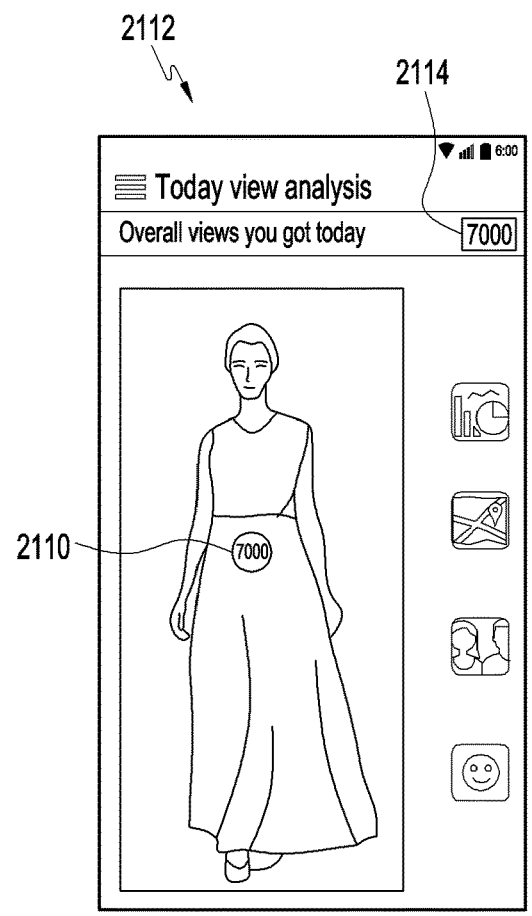

FIGS. 21A-21C illustrate a use case where the system 100 is implemented in garment/fashion industry. In this industry, the system 100 may be implemented by a fashion/garment enterprise, say enterprise A, to capture data related to latest clothing trends and understand public's preference with reference to the latest clothing trends. As an example, the enterprise A may affix wearable computing devices onto clothing items, which are to be displayed during a fashion show. As illustrated in FIG. 21A, when the clothing items are showcased to the public, a plurality of gazes 2100 from viewers are captured and stored as gaze data in a manner as described previously in FIG. 1. On the captured gaze data, viewer gaze analysis may be performed and result analysis may be viewed subsequently. For instance, as shown in FIG. 21B, result analysis for a clothing item 2102 is displayed through a GUI 2104. As shown in FIG. 21B, a total number of gaze hits are displayed using an indicator 2106. Further individual gaze hits are also displayed using indicators 2108-1, 2108-2, and 2108-3. Similarly, as shown in FIG. 21C, result analysis for another clothing item 2110 is displayed through a GUI 2112. As shown in FIG. 21C, a total number of gaze hits are displayed using an indicator 2114. Based on the result analysis, the enterprise A may learn about the public's preference for latest fashion trend and accordingly may plan their clothing line.

Figure 22A:
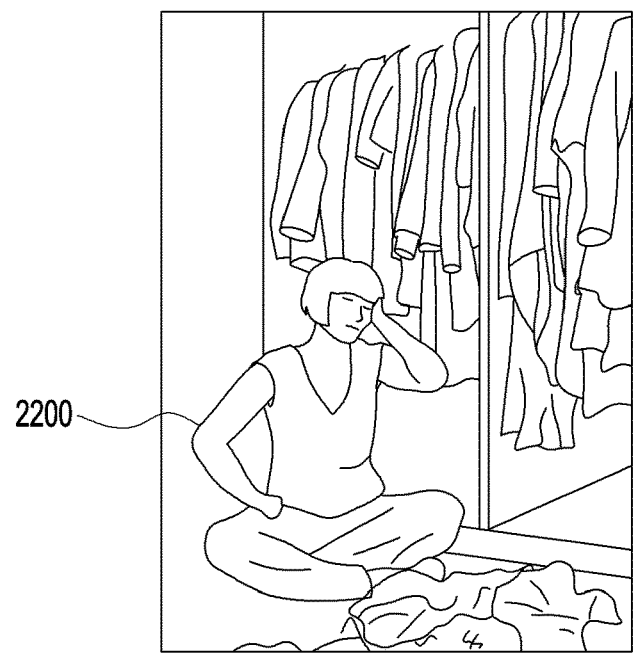
FIGS. 22A-22B illustrate a use case, according to an embodiment.
Figure 22B:
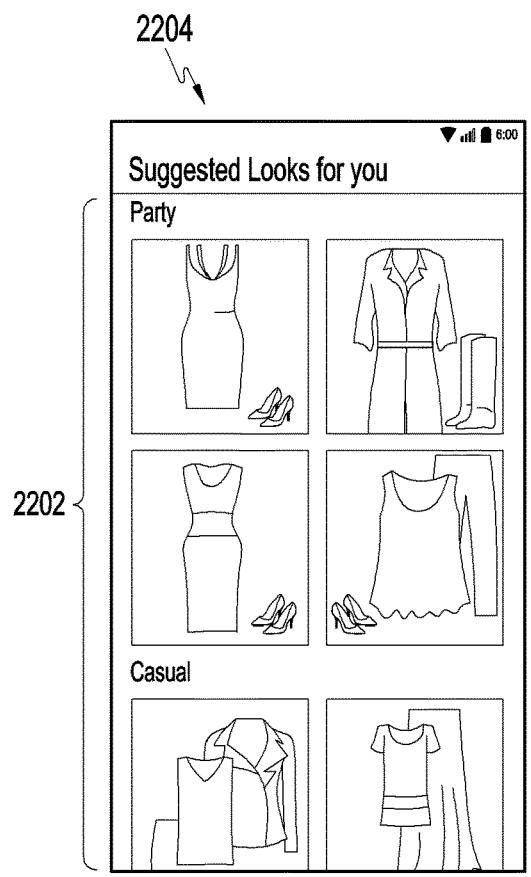

FIGS. 22A-22B illustrate a use case where recommendations related to wearing/purchasing clothing items are provided to a user. As shown in FIG. 22A, a user 2200 may get confused as to what clothing items to wear to work, parties, and events. In an example, the user 2200 may implement the system 100 using wearable computing device(s) and computing device(s) as described previously. Accordingly, the user 2200 may be provided with recommendations related to clothing items. For instance, as shown in FIG. 22B, the user may be provided with a plurality of recommendations 2202 related to clothing items that the user 2200 may wear to office, events, parties, and the like. In an example, the recommendations 2202 may relate to the clothing items from the user 2200's wardrobe. In another example, the recommendations 2202 may relate to clothing items that the user 2200 may purchase. As shown in the FIG. 22B, the recommendations 2202 are displayed to the user 2200 through a GUI 2204.

Figure 23A:
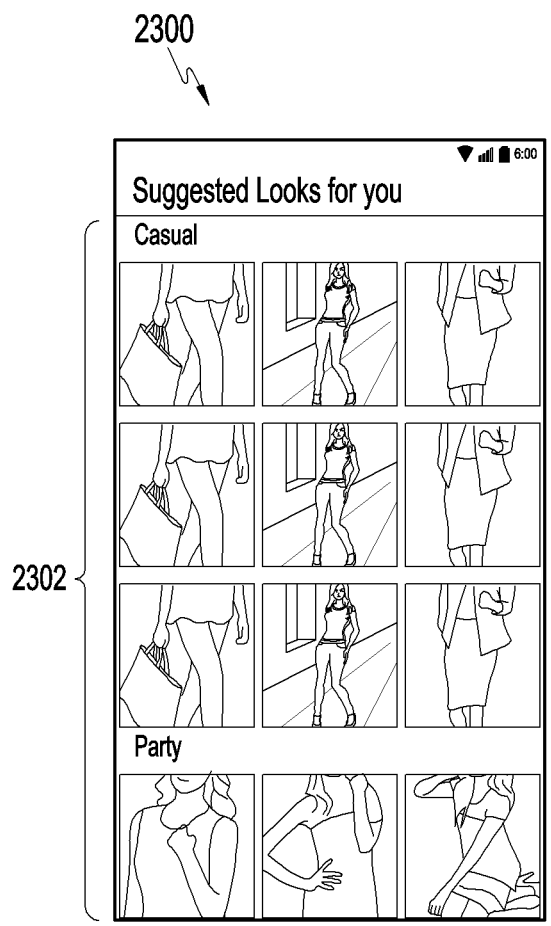
FIGS. 23A-23B illustrate a use case according to yet another embodiment.
Figure 23B:
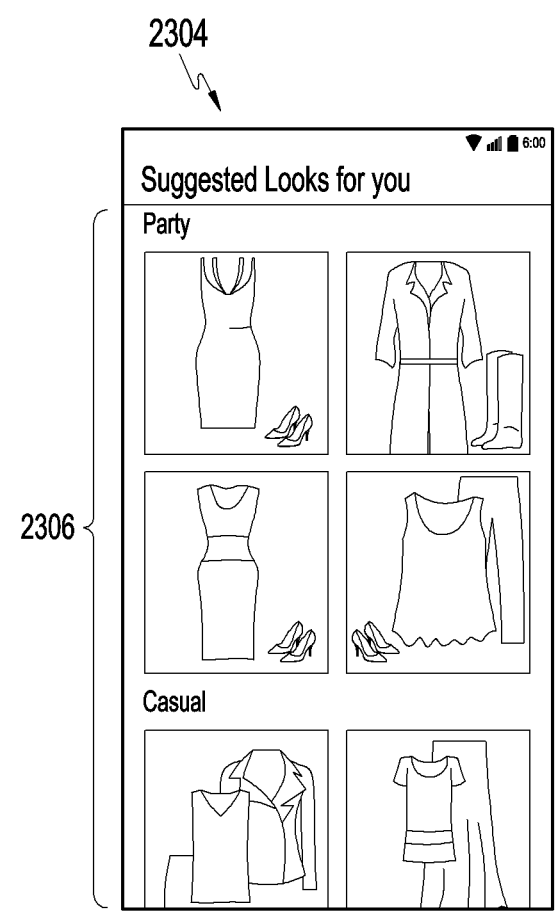

FIGS. 23A-23B illustrate a use case where shopping recommendations are provided to a user. As mentioned previously, the system 100 maintains a repository of the user's wardrobe and captures gazes received from viewers in respect of the items the user is wearing. Thus, for each of the items of the user, a gaze count is maintained. Accordingly, in a case where the user may wish to go out shopping, the user may seek recommendations related to clothing items that he/she may purchase. In this case, the system 100 provides recommendations for purchasing clothing items based on the gaze data collected for the user. In an example, the recommendations may be based on color, style, patterns, popular looks of the user, and the like. FIG. 23A shows a GUI 2300. As shown in FIG. 23A, the GUI 2300 displays a plurality of recommendations 2302 for casual wear and party wear to the user. Similarly, FIG. 23B shows a GUI 2304 where a plurality of recommendations 2306 for party and casual wear are displayed to the user. Thus, in an example, the system 100 serves as a self-shopping assistant.

Figure 24A:
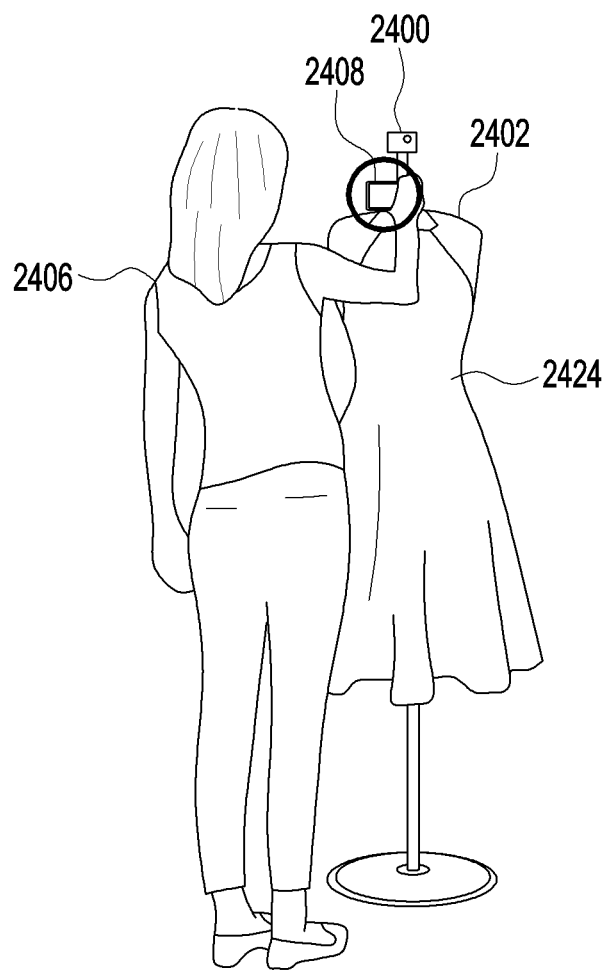
FIGS. 24A-24C illustrate a use case according to an embodiment.
Figure 24B:
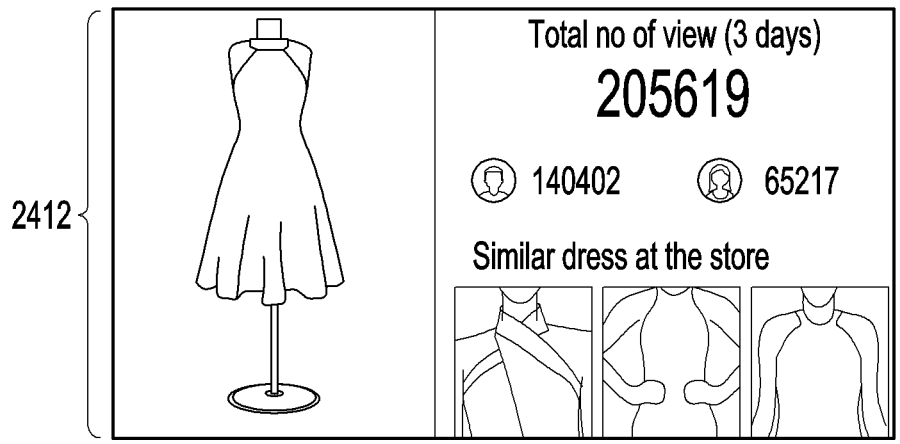
Figure 24C:
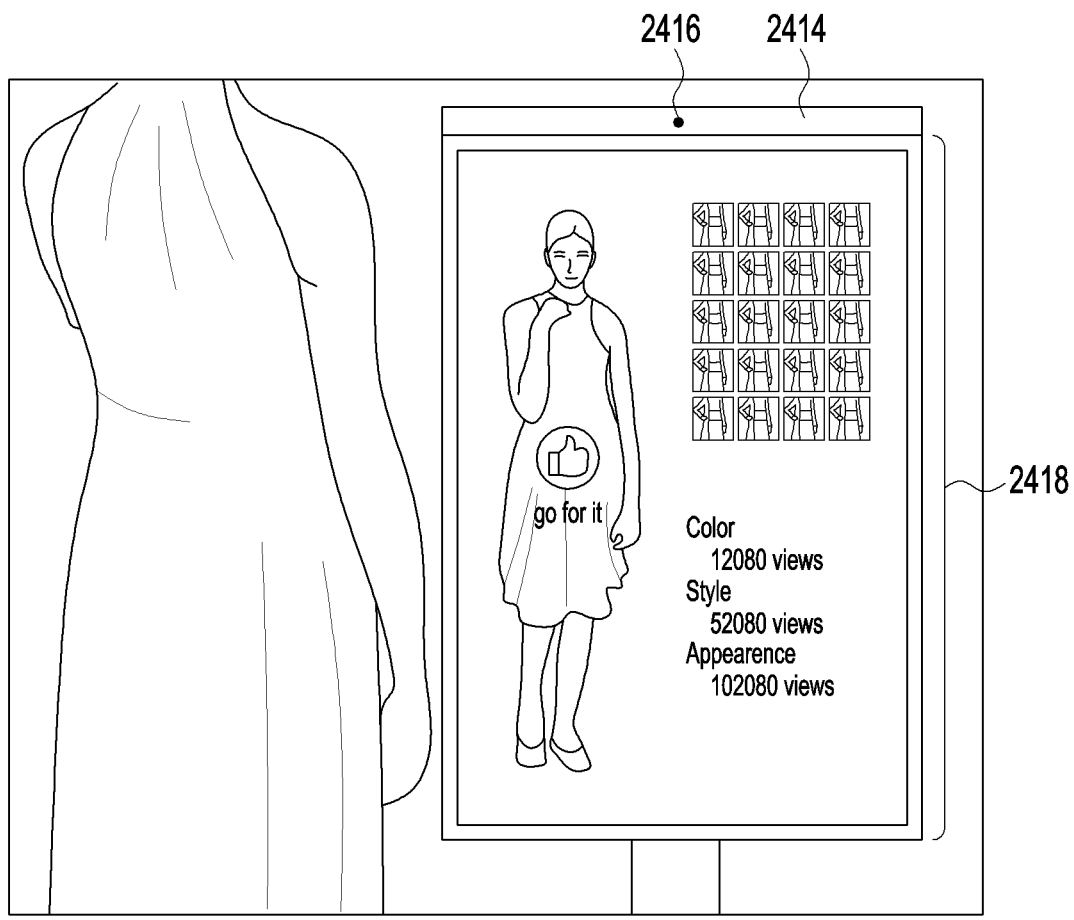

FIGS. 24A-24C illustrate a use case where shopping recommendations are provided to users. In this use case, shopping assistance is provided to the users seeking to purchase clothing items in a clothing store. In an example, a store may deploy devices on mannequins displaying clothing items. For instance, as shown in the FIG. 24A, a device 2400 is deployed on a mannequin 2402 displaying a clothing item 2404. In this example, the device 2400 may capture viewer gazes received in respect of the clothing item 2404. Based on the captured gazes, the device 2400 may maintain a record of the gaze hits received in respect of the clothing item 2404. In an example, a user 2406 may retrieve the gaze data related to the clothing item 2404 using a computing device 2408. Referring to FIG. 24B, a GUI 2410 illustrating result analysis 2412 based on the gaze data is shown. The result analysis 2412 may include a total number of views received, views received from each gender, and similar dresses that the store may have.

Based on the result analysis, the user 2406 may decide to try the clothing item 2404. In an example, after trying the clothing item 2404, the user 2406 may click a self-image. Based on the self-image and the gaze data associated with the user, the user may be provided result analysis indicative of whether the clothing item 2404 would suit him or not. In another example, as illustrated in FIG. 24C, the user 2406 may stand in front of a smart mirror 2414 and may synchronize the gaze data associated with the user with the smart mirror 2414. The smart mirror 2414 may be understood as a mirror comprising a camera 2416, and one or more hardware units for performing functions as described herein. In this example, the camera 2416 may capture an image of the user 2406. Based on the image and the gaze data associated with the user 2406, the smart mirror 2414 may provide result analysis 2418 to the user 2406. The result analysis 2418 may include number of views for the clothing item 2404 and may include a recommendation as to whether the user 2406 should buy the clothing item 2404 or not. Thus, the user 2406 is assisted in shopping.

Figure 25A:
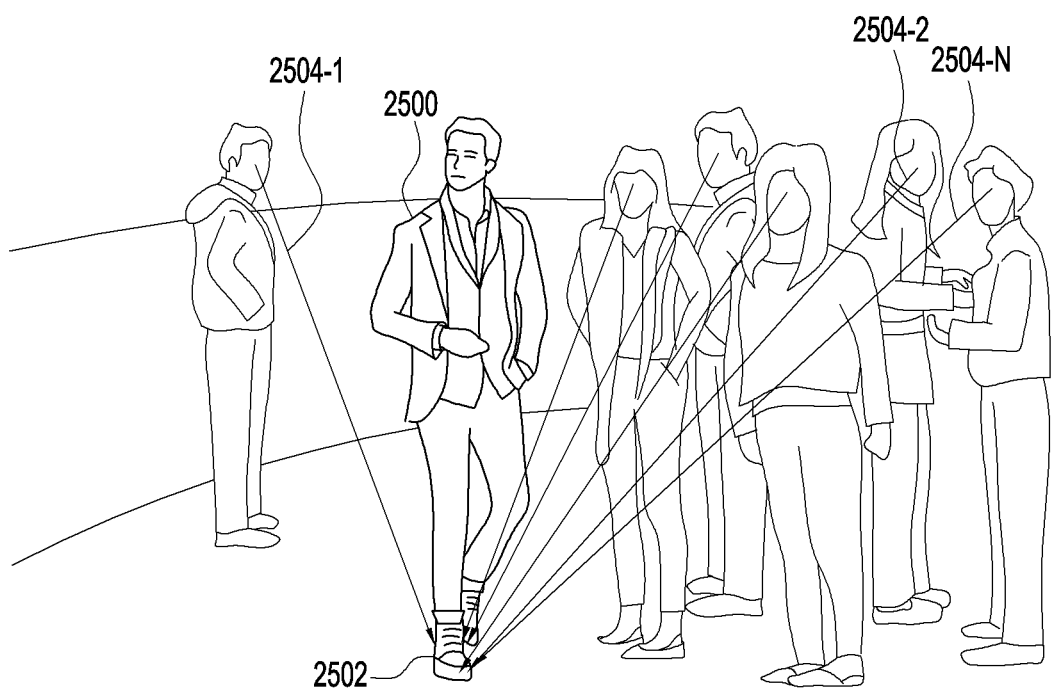
FIGS. 25A-25B illustrate a use case according to another embodiment.
Figure 25B:

FIGS. 25A-25B illustrate a use case where the system 100 identifies a unique item that the user may be wearing. Referring to FIG. 25A, a user 2500 wearing a shoe 2502 is shown. In an example, the user 2500 may receive a plurality of viewer gazes 2504-1, 2504-2, . . . , and 2504-N, collectively referred to as gazes 2504. In an example where a number of the gazes 2504 become equal to or greater than a threshold number, the user 2500 may be notified. For instance, the shoe 2502 may be defective and hence may receive high number of gazes 2504. In another example, the shoe 2502 may be unique and good in color and hence, may receive high number of gazes 2504. Referring to FIG. 25B, a GUI 2506 is shown. The GUI 2506 includes an indicator 2508 indicative of the unique item, i.e., the shoe 2502. In an example, the gaze hits received in respect of the shoe 2502 may also be displayed on the GUI 2506. Based on the notification, in an example, the user 2500 may take necessary action if any repair/replacement of the shoe 2502 is required.

Figure 26:
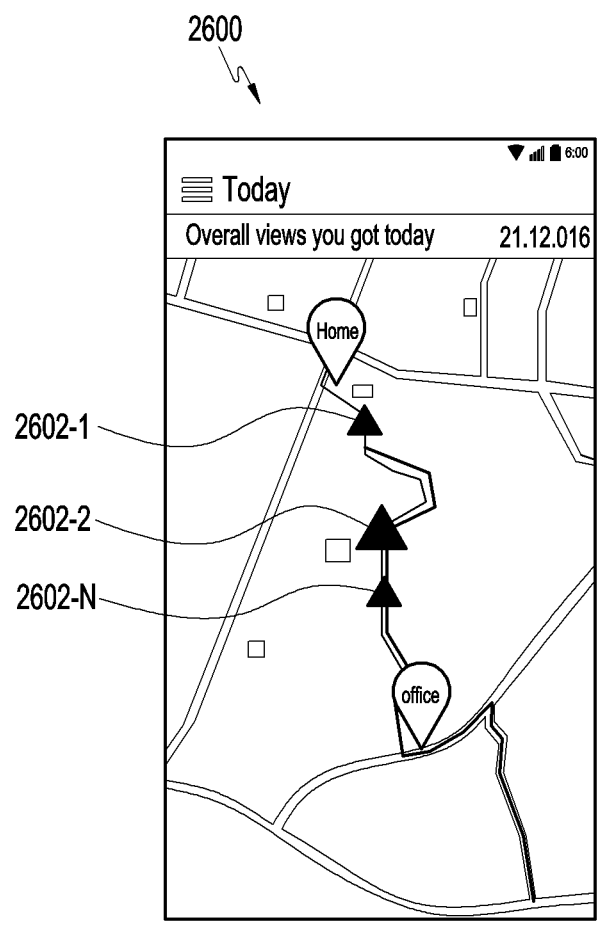
FIG. 26, illustrates a GUI of an application provided on a computing device of a user.

Referring to FIG. 26, a GUI 2600 is shown. In an example, the user may seek to view locations where the viewer gazes has been received. In this example, the system 100 may analyze the gaze data and may display the result on the GUI 2600. For instance, as shown in the FIG. 26, a plurality of locations 2602-1, 2602-2, . . . , 2602-N, collectively referred to as locations 2602 is shown. The locations 2602 indicate the locations where the viewer gazes have been received. In an example, the user may filter the gazes based on the location. In another example, the user may select locations where maximum gaze hits have been received.

Figure 27:
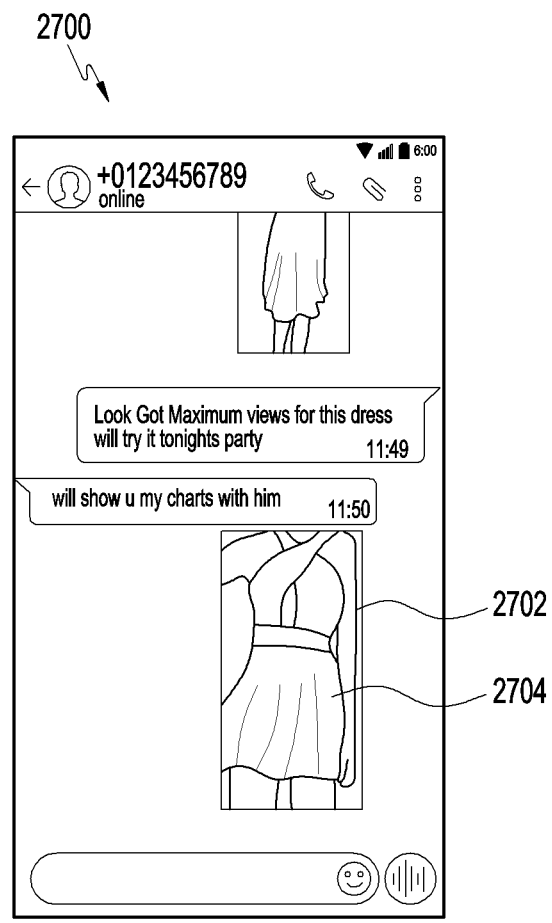
FIG. 27 illustrates a use case according to an embodiment.

FIG. 27 illustrates a use case where the user may share the result analysis with his/her friends. In FIG. 27, a GUI 2700 is shown. The GUI 2700 is an interface of a messaging application through which the user may share the result analysis with his/her friends. The GUI 2700 includes a snapshot 2702 of a result analysis for a particular clothing item 2704 of the user. The user may accordingly, receive feedback in relation to the clothing item 2704 from his/her friends. For instance, the user may wish to wear the clothing item 2704 to a party and thus, may share the result analysis for the clothing item 2704 with his/her friends.

The embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner. Instructions for performing methods according to various embodiments may be stored on a non-transitory readable medium.

While specific language has been used to describe the present disclosure, any limitations arising on account thereto, are not intended. As would be apparent to a person in the art, various working modifications may be made to the method in order to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method comprising:
   detecting, by a wearable computing device, at least one item worn by a user of the wearable computing device, wherein the wearable computing device is worn by the user and different from the at least one item;

detecting, by the wearable computing device, gazes of a plurality of viewers, each of the gazes being towards the at least one item worn by the user of the wearable computing device, and generating, by the wearable computing device, a gaze pattern of the gazes of the plurality of viewers for the at least one item based on the detected gazes of the plurality of viewers; and providing, by the wearable computing device, at least one recommendation for the user based on the gaze pattern.

2. The method as claimed in claim 1, further comprising storing at least one gaze parameter associated with the gazes, wherein the at least one gaze parameter includes at least one of:
a gaze duration of each of the gazes;
a location where the each of the gazes is detected;
a face shot of each of the viewers;
a body shot of each of the viewers;
a time associated with each of the gazes;
a facial expression of each of the viewers;
an audio of each of the viewers;
an identity of each of the viewers;
a gender of each of the viewers; and
a gaze identity of each of the gazes.

3. The method as claimed in claim 1, wherein the gaze pattern for the at least one item worn by the user is generated based on the gazes and at least one gaze parameter associated with the gazes, and
wherein the method further comprises updating gaze data based on at least the gaze pattern.

4. The method as claimed in claim 3, wherein the providing comprises analyzing the gaze data based on the at least one gaze parameter for providing the at least one recommendation.

5. The method as claimed in claim 3, further comprising:
detecting an upcoming event; and
analyzing the gaze data based on the at least one gaze parameter for providing the at least one recommendation.

6. The method as claimed in claim 1, wherein the at least one recommendation includes at least one of:
a recommendation to wear the at least one item based on at least one gaze parameter associated with the gazes;
a recommendation to wear the at least one item for an upcoming event;
a recommendation to purchase a further item based on the at least one item; and
a cumulative personality index associated with the at least one item.

7. The method as claimed in claim 1, wherein the detection of the at least one item worn by the user comprises:
accessing an image of the user; and
identifying a plurality of items worn by the user based on the image of the user.

8. The method as claimed in claim 7, further comprising:
computing a width and a height of the user based on at least one of the image of the user and a user input; and
detecting a position of the wearable computing device based on at least one of the image of the user and the user input.

9. The method as claimed in claim 7, further comprising mapping the at least one item worn by the user onto at least one virtual body zone from a plurality of body zones.

10. The method as claimed in claim 9, wherein the detection of the gazes comprises mapping the gazes onto the at least one virtual body zone based on at least one of:

a distance of each of the viewers from the user;
a viewing angle of each of the viewers;
a threshold time period; and
an area of the at least one virtual body zone.

11. The method as claimed in claim 1, wherein the method is implemented by a system, and
wherein the detection of the gazes is based on at least one hardware specification of the system.

12. The method as claimed in claim 1, wherein the detection of the gazes is further based on a set of user defined rules, the set of user defined rules comprising at least one of:
the user being at a predetermined location;
each of the gazes being detected during a predefined time period of the day;
each of the viewers being a predefined user;
each of the viewers being of a predefined gender;
the at least one item being a user selected item;
each of the gazes being of a predefined duration; and
a gaze frequency being greater than a predefined threshold frequency.

13. The method as claimed in claim 1, wherein the detection of the gazes comprises detecting the gazes using a camera.

14. A method comprising:
detecting, by a wearable computing device, at least one item worn by a user of the wearable computing device, wherein the wearable computing device is worn by the user and different from the at least one item;
detecting, by the wearable computing device, gazes of a plurality of viewers, each of the gazes being towards the at least one item worn by the user of the wearable computing device;
generating, by the wearable computing device, a gaze pattern of the gazes of the plurality of viewers for the at least one item worn by the user based on the detected gazes of the plurality of viewers; and
providing, by the wearable computing device, the gaze pattern to the user.

15. The method as claimed in claim 14, further comprising detecting at least one gaze parameter associated with the gazes,
wherein the at least one gaze parameter includes at least one of:
a gaze duration of each of the gazes;
a location where each of the gazes is detected;
a face shot of each of the viewers;
a body shot of each of the viewers;
a time associated with each of the gazes;
a facial expression of each of the viewers;
an audio of each of the viewers;
an identity of each of the viewers;
a gender of each of the viewers; and
a gaze identity of each of the gazes; and
updating gaze data based on the gaze pattern and the at least one gaze parameter; and
providing at least one recommendation to the user based on the updated gaze data.

16. The method as claimed in claim 14, wherein the detection of the gazes comprises detecting the gazes using a camera.

17. A wearable computing device comprising:
a processor; and
a memory storing instructions executable by the processor, wherein the processor is configured to:
  detect at least one item worn by a user of the wearable computing device, wherein the wearable computing device is worn by the user and different from the at least one item;
  detect gazes of a plurality of viewers, each of the gazes being towards the at least one item worn by the user of the wearable computing device and generate a gaze pattern of the gazes of the plurality of viewers for the at least one item based on the detected gazes of the plurality of viewers; and
  provide at least one recommendation for the user based on the gaze pattern.

18. The wearable computing device as claimed in claim 17, wherein the processor is further configured to store at least one gaze parameter associated with the gazes, wherein the at least one gaze parameter includes at least one of:
  a gaze duration of each of the gazes;
  a location where each of the gazes is detected;
  a face shot of each of the viewers;
  a body shot of each of the viewers;
  a time associated with each of the gazes;
  a facial expression of each of the viewers;
  an audio of each of the viewers;
  an identity of each of the viewers;
  a gender of each of the viewers; and
  a gaze identity of each of the gazes.

19. The wearable computing device as claimed in claim 17, wherein the processor is further configured to:
  generate the gaze pattern for the at least one item worn by the user based on the gazes and at least one gaze parameter associated with the gazes; and
  update gaze data based on at least the gaze pattern.

20. The wearable computing device as claimed in claim 19, wherein the processor is further configured to analyse the gaze data based on the at least one gaze parameter for providing the at least one recommendation.

21. The wearable computing device as claimed in claim 19, wherein the processor is further configured to:
  detect an upcoming event; and
  analyse the gaze data based on the at least one gaze parameter for providing the at least one recommendation.

22. The wearable computing device as claimed in claim 17, wherein the at least one recommendation includes at least one of:
  a recommendation to wear the at least one item based on at least one gaze parameter associated with the gazes;
  a recommendation to wear the at least one item for an upcoming event;
  a recommendation to purchase a further item based on the at least one item; and
  a cumulative personality index associated with the at least one item.

23. The wearable computing device as claimed in claim 17, wherein, for detection of the at least one item worn by the user, the processor is further configured to:
  access an image of the user; and
  identify a plurality of items worn by the user based on the image of the user.

24. The wearable computing device as claimed in claim 23, wherein the processor is further configured to:
  compute a width and a height of the user based on at least one of the image of the user and a user input; and
  detect a position of the wearable computing device based on at least one of the image of the user and the user input.

25. The wearable computing device as claimed in claim 23, wherein the processor is further configured to map the at least one item worn by the user onto at least one virtual body zone from a plurality of body zones.

26. The wearable computing device as claimed in claim 25, wherein, for detection of the gazes, the processor is further configured to map the gazes onto the at least one virtual body zone based on at least one of:
  a distance of each of the viewers from the user;
  a viewing angle of each of the viewers;
  a threshold time period; and
  an area of the at least one virtual body zone.

27. The wearable computing device as claimed in claim 17, wherein the processor is further configured to detect the gazes based on a set of user defined rules, the set of user defined rules comprising at least one of:
  the user being present at a predetermined location;
  each of the gazes being detected during a predefined time period of the day;
  each of the viewers being a predefined user;
  each of the viewers being of a predefined gender;
  the at least one item being a user selected item;
  each of the gazes being of a predefined duration; and
  a gaze frequency being greater than a predefined threshold frequency.

28. The wearable computing device as claimed in claim 17, further comprising a camera configured to obtain an image of each of the viewers,
  wherein the processor is further configured to detect each of the gazes based on the obtained image.

29. A wearable computing device comprising:
  a processor; and
  a memory storing instructions executable by the processor,
  wherein the processor is configured to:
  detect at least one item worn by a user of the wearable computing device, wherein the wearable computing device is worn by the user and different from the at least one item;
  detect gazes of a plurality of viewers, each of the gazes being towards the at least one item worn by the user of the wearable computing device;
  generate a gaze pattern of the gazes of the plurality of viewers for the at least one item worn by the user based on the detected gazes of the plurality of viewers; and
  provide the gaze pattern to the user.

30. The wearable computing device as claimed in claim 29, wherein the processor is further configured to:
  detect at least one gaze parameter associated with the gazes,
  wherein the at least one gaze parameter includes at least one of:
  a gaze duration of each of the gazes;
  a location where each of the gazes is detected;
  a face shot of each of the viewers;
  a body shot of each of the viewers;
  a time associated with each of the gazes;
  a facial expression of each of the viewers;
  an audio of each of the viewers;
  an identity of each of the viewers;
  a gender of each of the viewers; and
  a gaze identity of each of the gazes; and
  update gaze data based on the gaze pattern and the at least one gaze parameter.

31. The wearable computing device as claimed in claim 30, wherein the processor is further configured to provide at least one recommendation to the user based on the updated gaze data.

32. The wearable computing device as claimed in claim 29, further comprising a camera configured to obtain an image of each of the viewers,
wherein the processor is further configured to detect each of the gazes based on the obtained image.

33. A computer program product that includes a non-transitory computer recording medium for storing a computer program that is capable of being executed by an electronic device, the computer program comprising:
an operation of detecting, by a wearable computing device, at least one item worn by a user of the wearable computing device, wherein the wearable computing device is worn by the user and different from the at least one item;
an operation of detecting, by the wearable computing device, gazes of a plurality of viewers, each of the gazes being towards the at least one item worn by the user of the wearable computing device and an operation of generating, by the wearable computing device, a gaze pattern of the gazes of the plurality of viewers for the at least one item based on the detected gazes of the plurality of viewers; and
an operation of providing, by the wearable computing device, at least one recommendation for the user based on the gaze pattern.

34. A computer program product that includes a non-transitory computer recording medium for storing a computer program that is capable of being executed by an electronic device, the computer program comprising:
an operation of detecting, by a wearable computing device, at least one item worn by a user of the wearable computing device, wherein the wearable computing device is worn by the user and different from the at least one item;
an operation of detecting, by the wearable computing device, gazes of a plurality of viewers, each of the gazes being towards the at least one item worn by the user of the wearable computing device;
an operation of generating, by the wearable computing device, a gaze pattern of the gazes of the plurality of viewers for the at least one item worn by the user based on the detected gazes of the plurality of viewers; and
an operation of providing, by the wearable computing device, the gaze pattern to the user.

* * * * *